United States Patent
Chauhan et al.

(10) Patent No.: US 11,477,263 B2
(45) Date of Patent: *Oct. 18, 2022

(54) IDENTIFYING UN-DEPLOYED FEATURES OF AN APPLICATION

(71) Applicant: SPLUNK INC., San Francisco, CA (US)

(72) Inventors: Vijay Chauhan, Burlingame, CA (US); Liu-Yuan Lai, San Francisco, CA (US); Wenhui Yu, Sunnyvale, CA (US); Luke Murphey, Wadsworth, IL (US); David Hazekamp, Tinley Park, IL (US)

(73) Assignee: Splunk Inc., San Francisco, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 16/920,911

(22) Filed: Jul. 6, 2020

(65) Prior Publication Data

US 2020/0336532 A1 Oct. 22, 2020

Related U.S. Application Data

(63) Continuation of application No. 16/397,434, filed on Apr. 29, 2019, now Pat. No. 10,735,492, which is a continuation of application No. 14/690,741, filed on Apr. 20, 2015, now Pat. No. 10,320,877.

(51) Int. Cl.
| | |
|---|---|
| *H04L 67/02* | (2022.01) |
| *H04L 67/00* | (2022.01) |
| *G06F 8/60* | (2018.01) |
| *G06F 8/61* | (2018.01) |
| *H04L 67/75* | (2022.01) |

(52) U.S. Cl.
CPC ............... *H04L 67/02* (2013.01); *G06F 8/60* (2013.01); *G06F 8/61* (2013.01); *H04L 67/34* (2013.01); *H04L 67/75* (2022.05); *G06F 8/62* (2013.01)

(58) Field of Classification Search
CPC ......... H04L 67/02; H04L 67/34; H04L 67/36; G06F 8/60; G06F 8/61; G06F 8/62
See application file for complete search history.

(56) References Cited

U.S. PATENT DOCUMENTS

| | | | |
|---|---|---|---|
| 6,418,554 B1 * | 7/2002 | Delo | G06F 8/61 717/174 |
| 6,859,793 B1 | 2/2005 | Lambiase | |
| 8,645,837 B2 | 2/2014 | Little | |
| 9,442,709 B1 * | 9/2016 | Delker | G06F 8/65 |

(Continued)

*Primary Examiner* — David R Lazaro
(74) *Attorney, Agent, or Firm* — Shook, Hardy & Bacon L.L.P.

(57) ABSTRACT

Provided are systems and methods for indicating deployment of application features. In one embodiment, a method is provided that includes determining available features of a current deployment of an application for receiving machine-generated data from one or more data sources of a data system, determining un-deployed features of the current deployment of the application, wherein the un-deployed features comprise one or more of the available features that is configured to use input data from a data source and wherein the input data is not available to the feature in the current deployment of the application, and causing display of a deployment graphical user interface (GUI) that comprises an indication of the un-deployed features.

19 Claims, 20 Drawing Sheets

(56) References Cited

U.S. PATENT DOCUMENTS

| | | |
|---|---|---|
| 10,320,877 B2 * | 6/2019 | Chauhan ............... G06F 8/61 |
| 10,735,492 B2 * | 8/2020 | Chauhan ............... G06F 8/60 |
| 2002/0178254 A1 | 11/2002 | Brittenham et al. |
| 2003/0145317 A1 * | 7/2003 | Chamberlain ......... G06F 8/61 |
| | | 717/177 |
| 2003/0225851 A1 * | 12/2003 | Fanshier ............... G06F 8/61 |
| | | 709/208 |
| 2005/0160104 A1 * | 7/2005 | Meera .................. G06F 8/36 |
| 2006/0041662 A1 | 2/2006 | Georgiev et al. |
| 2006/0101347 A1 * | 5/2006 | Runov ............. G06F 16/9038 |
| | | 715/764 |
| 2007/0050493 A1 | 3/2007 | Sienel et al. |
| 2008/0092131 A1 * | 4/2008 | McIntyre ............. G06F 9/451 |
| | | 717/172 |
| 2010/0077475 A1 * | 3/2010 | Deschenes ............. G06F 8/62 |
| | | 726/21 |
| 2011/0029882 A1 | 2/2011 | Jaisinghani |
| 2014/0164186 A1 | 6/2014 | Lee et al. |
| 2015/0089018 A1 | 3/2015 | Soni et al. |
| 2015/0350806 A1 * | 12/2015 | Britton ................. H04W 4/60 |
| | | 455/411 |
| 2016/0308733 A1 * | 10/2016 | Chauhan ............... G06F 8/61 |
| 2018/0092131 A1 | 4/2018 | McIntyre et al. |
| 2019/0260819 A1 * | 8/2019 | Chauhan ............. H04L 67/34 |

* cited by examiner

```
Original Search: 1501
search "error" | stats count BY host

Sent to peers: 1502
search "error" | prestats count BY host(map)

Executed by search head: 1503
Merge prestats results received from peers (reduce)
```

IDENTIFYING UN-DEPLOYED FEATURES OF AN APPLICATION

The present disclosure is generally directed to deploying applications, and more particularly, to systems and methods for indicating deployment of application features. This application is a continuation of U.S. application Ser. No. 16/397,434, filed Apr. 29, 2019, which is itself a continuation of U.S. patent application Ser. No. 14/690,741, filed Apr. 20, 2015, now issued as U.S. Pat. No. 10,320,877. The entire contents of each of the above-listed applications are hereby incorporated by reference for all purposes as if fully set forth herein.

TECHNICAL FIELD

Background of the Invention

Modem data centers often comprise thousands of hosts that operate collectively to service requests from even larger numbers of remote clients. During operation, components of these data centers can produce significant volumes of machine-generated data. The machine-generated data is often stored in searchable indexes. Users typically employ a search application to search the indexed data, access reports on the indexed data, and the like. In some instances, a search application includes one or more features (also referred to as "content objects" or "knowledge objects") that can use data (e.g., received from one or more data sources) to generate visualizations of the data, such as such as a displayed metrics, tables, charts, graphs and the like. In the context of an enterprise security (ES) application that consolidates data across an organizations network, for example, one feature may indicate a number of unsuccessful user attempts to log-on to the organizations network. Such a reporting feature may rely on receiving data regarding user log-on attempts from one or more of the organizations authentication servers that process log-on attempts. In some instances, some of the features available with an application may not be deployed. For example, if a system executing the application is not configured to receive data from an authentication server such that the log-on data relied on by the feature is not being provided, then the feature may not be deployed because it does not have access to the data it needs. In certain situations, it can be helpful for a user to know the deployment status of features. In the context of ES, for example, a system administrator may want to know that he/she is utilizing as many available application features as possible to monitor potential breaches of security.

BRIEF DESCRIPTION OF THE SEVERAL VIEWS OF THE DRAWING

FIG. 9 illustrates an example search query received from a client and executed by search peers in accordance with the disclosed embodiments.

FIG. 10B illustrates an example data summary dialog that enables a user to select various data sources in accordance with the disclosed embodiments.

FIG. 11B illustrates an example incident review dashboard in accordance with the disclosed embodiments.

DETAILED DESCRIPTION OF THE INVENTION

Figure 1:
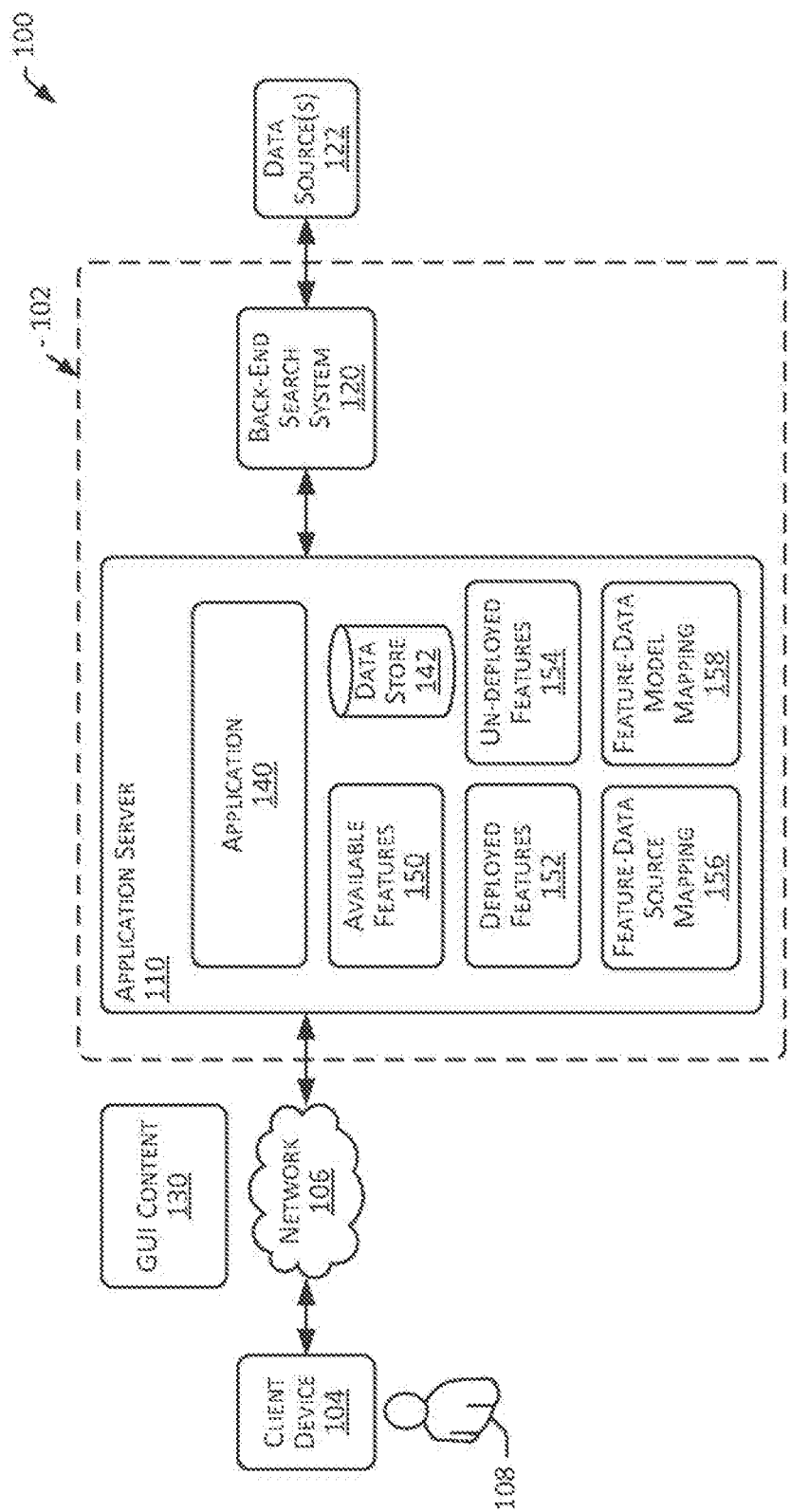
FIG. 1 illustrates an example data processing environment in accordance with the disclosed embodiments.

The present disclosure is directed to indicating deployment of application features. As described herein, in some embodiments, an application may include one or more available features that can be deployed, a determination can be made as to which of the available features are deployed and/or un-deployed in a current deployment of the application, and an indication of the un-deployed and/or un-deployed features can be provided, for example, via an interactive deployment completeness GUI. Such an indication may enable a user to easily determine, for example, what features are and are not properly setup for use in a current configuration of the application (also referred to as a "current deployment of the application"). For example, in the context of an enterprise security (ES) application that provides for the collection, searching, and reporting of machine-generated data, such as data received from an organizations servers and the like, determinations can be made as to what features are available (e.g., an "unsuccessful log-on" key indicator feature that can indicate a number of unsuccessful attempts to log-on to one of the organization's applications in the last 24 hours, a "current user sessions" key indicator feature that can indicate a number of current user sessions on the organization's network, a "malware dashboard" feature that can indicate a trend of malicious activity, such as a rolling plot of a rate of infections of the company's system in the last week, and/or the like), what features are deployed (e.g., properly setup for use in a current deployment of the application), and what features are un-deployed (e.g., not properly setup for use in a current deployment of the application). A deployment completeness GUI can be displayed to a user, such as a system administrator, to indicate the features that are deployed and/or the features that are un-deployed in the current deployment of the ES application. In some embodiments, for some or all of the un-deployed features, information regarding deploying the un-deployed feature (e.g., one or more conditions or suggestions for deploying the un-deployed feature) can be determined, and the deployment completeness GUI can communicate the information the information. Thus, a user can easily determine what features are un-deployed and/or how to configure the system to deploy the features. For example, if it is determined that the unsuccessful log-on key indicator is not deployed because the application is currently not receiving log-on data for the indicator, such log-on data generated by an authentication, the deployment profile dashboard may include suggestions for configuring the application to ingest log-on data and/or may provide an interactive link to a page for configuring the application to ingest log-on data from an authentication server.

In some embodiments, a feature (also referred to as "content objects" or "knowledge objects") can include content for communicating information about data received from one or more data sources. For example, a unsuccessful log-on key indicator feature may display a value indicator that is a count of unsuccessful attempts to log-on to one of the organization's applications in the last 24 hours, a trend amount that displays a change in the count over a period of time, a trend indicator that indicates an increasing or decreasing trend in the count, and/or the like. In some embodiments, a feature can rely on input data (e.g., machine-generated data) provided by one or more data sources for use in populating the content of the object. For example, an unsuccessful log-on key indicator feature may rely on log-on data provided by one or more authentication servers. In some embodiments, a feature may execute one or more predefined routines to processes the input data and generate content based on the input data. For example, the machine-generated data may be parsed, indexed and stored to generate an index of time-stamped events, the feature may be associated with a predefined search that is executed to locate a relevant subset of the events, and the subset of events can be processed to generate metrics that are used to populate the content displayed for the feature. Examples of searches of machine-generated data that can be employed to identify data used to populate features, including searches employ late binding schema, are described in more detail below with regard to at least FIGS. 5-11D. In the context of the unsuccessful log-on key indicator feature, for example, the feature may include a predefined search to locate events indicating unsuccessful user log-on attempts, and can use the identified events to determine the values needed to populate the content displayed by the feature, such as the number of unsuccessful log-on attempts in the last 24 hours. Although certain features are described herein for the purpose of illustration, embodiments can include any variety of features. Some example of features are described in more detail below with regard to at least FIGS. 10A-11D, including a detailed description of key indicators with regard to at least FIG. 11A.

In the context of machine-generated data, data sources can include, for example, applications, application servers, web servers, databases, networks, virtual machines, telecom equipment, operating systems, sensors, and/or the like. Although certain data sources are described herein for the purpose of illustration, embodiments can include any variety of data sources. Some example of data sources are described in more detail below with regard to at least FIGS. 5-11D.

A current deployment of an application may refer to a current configuration of the application, including, for example, current software and hardware configurations of the system on which the application is being executed. For example, a current deployment of an application may refer to settings for the application, add-on software (e.g., applications) installed to work with the application, the type and configuration of hardware that is being employed by the application (e.g., including data sources that are configured to provide input data to for the application and its features), and/or the like. Continuing with the above example, a first deployment of an ES application may refer to a configuration in which the ES application is installed on an application server and is receiving log-on data generated by a first authentication server, but the application server does not have an "add-on" mal-ware application installed that can be used to ingest infection data (e.g., from third party virus software installed on user computers throughout the organization) that can be used to populate a malware dashboard feature. In such an application deployment, the unsuccessful log-on key indicator may be determined to be deployed based on the application at least being configured to ingest log-on data that can be used to populate the feature, but the malware dashboard feature may not be determined to be deployed because the infection data for the feature is not being ingested and thus the feature cannot be populated. A second deployment of the ES application may refer to a configuration in which the add-on malware application is installed such that the ES application can receive the infection data. In such an application deployment, both of the unsuccessful log-on key indicator and the malware dashboard feature may be determined to be deployed based on the application at least being configured to ingest the log-on and infection data that can be used to populate the respective features.

As further described herein, in some embodiments, determining whether a feature is deployed or un-deployed in a current deployment of the application can include determining whether the feature is properly configured to receive or is otherwise receiving the data it needs to populate the associated content in the current deployment of the application. For example, it may be determined that the unsuccessful log-on key indicator feature is deployed in a current deployment of the application if the application is configured to receive log-on data and/or is receiving log-on data during use in the current deployment of the application. Conversely, it may be determined that the unsuccessful log-on key indicator feature is not deployed in a current deployment of the application if the application is not properly configured to receive log-on data and/or is not receiving log-on data during use in the current deployment of the application (e.g., in a scenario in which, despite the application being configured correctly, the authentication server is not sending log-on data to the application).

As further described herein, in some embodiments, a deployment completeness GUI (e.g., including a deployment profile overview GUI 310 described in more detail below with regard to at least FIGS. 3A-3E) for an application can include an indication of deployed features and/or un-deployed features for a current deployment of the application. For example, a deployment completeness GUI for an application can include a deployment percentage indicative of a percentage of the available features that are deployed in a current deployment of the application. If, for example, there are 1000 available features and 990 of the features are deployed (with 10 of the available features being un-deployed), then the deployment completeness GUI may display a deployment percentage value of 99%. In some embodiments, a deployment completeness GUI for an application can include an indication of a number of the un-deployed features in a current deployment of the application.

If, for example, there are 1000 available features and 990 of the features are deployed (with 10 of the available features being un-deployed), then the deployment completeness GUI may display an un-deployed feature value of 10.

In some embodiments, a feature can be related to a data model. A data model can include one or more "objects" (also referred to as "data model objects") that define or otherwise correspond to a specific set of data. A data model object may be defined by: (1) a set of search constraints; and (2) a set of fields. Thus, a data model object can be used to quickly search data to identify a set of events (e.g., a set of events that satisfy the set of search constraints of the data model object) and a set of fields associated with the set of events (e.g., the set of fields of the data model object that are in the set of events identified). For example, an "e-mails processed" data model object may specify a search for events relating to e-mails that have been processed by a given e-mail server, and specify a set of fields (e.g., date, size, etc.) that are associated with the events. A user can use the "e-mails processed" data model object to quickly identify a listing of the values for the set of fields (e.g., date, size, etc.) of the events relating to e-mails processed by the given e-mail server. By using a data model, the user may not have to recreate the associated search or re-identify the fields of interest. Example embodiments of data models and example usage of data models is described in U.S. patent application Ser. No. 14/503,335 titled "Generating Reports from Unstructured Data" and filed on Sep. 30, 2014, which is hereby incorporated by reference in its entirety.

As further described herein, in some embodiments, one or more features can be mapped to one or more data models. A feature may be mapped, for example, to a data model that can employ data associated with the feature. For example, the unsuccessful log-on key indicator may be populated with values based on tallying a number of events returned in response to predefined search for events provided by one or more authentication servers that have a timestamp associated with the last 24 hours that indicate an unsuccessful log-on attempt. If an authentication data model can make use of the same search, then the unsuccessful log-on key indicator feature may be mapped to the authentication data model. A similar mapping can be made between some or all of the data models and features of the application. A data model may be referred to as "un-deployed" in a current deployment of an application if all of the features mapped to the data model are un-deployed in the current deployment of the application. A data model may be referred to as "deployed" in a current deployment of the application if at least one of the features mapped to the data model is deployed in the current deployment of the application.

As further described herein, in some embodiments, a deployment completeness GUI for an application can include an indication of deployed data models and/or un-deployed data models for a current deployment of the application. For example, a deployment completeness GUI for an application can include an un-deployed data model indicator indicative of a number of the un-deployed data models in a current deployment of the application. If, for example, there are 100 data models and 98 of the data models are deployed (with 2 of the data models being tm-deployed), then the deployment completeness GUI may display an un-deployed data model value of 2. In some embodiments, a deployment completeness GUI for an application can include a listing of data models that includes a data model status for each of the data models, indicating whether the respective data model is deployed or un-deployed in the current deployment of the application.

As further described herein, in some embodiments, each of data models listed in a deployment completeness GUI may include interactive elements that are selectable to navigate to display of a data model deployment profile that lists the features mapped to the data model. In some embodiments, if a feature mapped to the data model is un-deployed, then the data model deployment profile can also display deployment content that communicates one more conditions for deploying the feature. The deployment content can include, for example, a suggested course of action that can be taken to deploy the feature. The deployment content can include, for example, content or links to content that provides instructions for configuring the application to intake data relied on by the un-deployed feature, installing an application to intake data relied on by the un-deployed feature, purchasing additional software or hardware needed to intake data relied on by the un-deployed feature, configuring hardware for a data source such that it can provide the data relied on by the un-deployed feature, and/or the like. For example, if the unsuccessful log-on key indicator is un-deployed, then the deployment content for the feature may indicate that it needs to receive log-on data, and include a link to instructions for configuring the ES application to receive log-on data from one or more authentication servers and/or the like.

Although certain embodiments are described with regard to certain types of applications (e.g., ES applications) and/or application features (e.g., an unsuccessful log-on key indicator feature) for the purpose of illustration, the described embodiments can be employed with any suitable applications and features.

Turning now to the figures, FIG. 1 illustrates an example data processing environment ("environment") 100 in accordance with the disclosed embodiments. In some embodiments, the environment 100 can include a search system 102 and a client device 104 communicatively coupled to one another via a communications network 106. The client device 106 may be used or otherwise accessed by a user 108, such as a system administrator or a customer. The search system 102 may include an application server 110 (e.g., a search server) communicatively coupled to a back-end search system 120. The back-end search system 120 may be the same or similar to that of search system 1100 described in more detail below with regard to at least FIG. 5. For example, the back-end search system 120 may include data sources, forwarders, indexers, index data stores, search heads and/or the like components that facilitate the intake, storage and searching of machine-generated data. In some embodiments, the back-end search system 120 is communicatively coupled one or more data sources 122.

The network 106 may include an element or system that facilitates communication between the entities of the environment 100, including, for example, the application server 110, the one or more client devices 104, and/or the like. The network 106 may include an electronic communications network, such as the Internet, a local area network (LAN), a wide area network (WAN), a wireless local area network (WLAN), a cellular communications network, and/or the like. In some embodiments, the network 106 can include a wired or a wireless network. In some embodiments, the network 106 can include a single network or a combination of networks.

A client device 104 may include any variety of electronic devices. In some embodiments, a client device 104 can include a device capable of communicating information via the network 106. A client device 104 may include one or more computer devices, such as a desktop computer, a server, a laptop computer, a tablet computer, a wearable computer device, a personal digital assistant (FDA), a smart phone, and/or the like. In some embodiments, a client device 104 may be a client of the application server 110. In some embodiments, a client device 104 can include various input/output (I/O) interfaces, such as a display (e.g., for displaying graphical user interfaces (GUIs)), an audible output user interface (e.g., a speaker), an audible input user interface (e.g., a microphone), an image acquisition interface (e.g., a camera), a keyboard, a pointer/selection device (e.g., a mouse, a trackball, a touchpad, a touchscreen, a gesture capture or detecting device, or a stylus), and/or the like. In some embodiments, a client device 104 can include general computing components and/or embedded systems optimized with specific components for performing specific tasks. In some embodiments, a client device 104 can include programs/applications that can be used to generate a request for content, to provide content, to render content, and/or to send and/or receive requests to and/or from other devices via the net-work 106. For example, a client device 104 may include an Internet browser application or a local data search and reporting application that facilitates communication with servers, such as the application server 110, via the network 106. In some embodiments, a program or application of a client device 104 can include program modules having program instructions that are executable by a computer system to perform some or all of the functionality described herein with regard to a client device 104. In some embodiments, a client device 104 can include one or more computer systems similar to that of the computer system 1000 described below with regard to at least FIG. 4.

The application server 110 may include a computing device having network connectivity and being capable of providing one or more services to network clients, such as a client device 104. These services can include, for example, ingesting, processing, storing, monitoring, searching data and/or serving content, such as deployment profile GUI content 130. The application server 110 may include an application 140 and a data store 142. The application 140 may include, for example, an enterprise application, such as ES application. The application 140 may provide for executing some or all of the functionality described herein with regard to the application 140 and/or the application server 110. The data store 142 may include a medium for the storage of data thereon. For example, the data store 142 may include a non-transitory computer-readable medium storing the application 140 (e.g., storing the executable code of the application 140), an application a listing of available features 150, a listing of deployed features 152, a listing of un-deployed features 154, and a feature-data source mapping 156, feature-data model mapping 158, and/or the like. As described herein a listing of available features 150 may include a listing of features that can be deployed with an application (e.g., an unsuccessful log-on key indicator feature, a current user sessions key indicator feature, a malware dashboard feature, and/or the like).

A listing of deployed features 152 may include a listing of available features that are deployed in a current deployment of the application. A listing of un-deployed features 154 may include a listing of available features that are not deployed in a current deployment of the application. A feature-data source mapping 156 may include a mapping of available features 150 to one or more data sources 122. This can include, for example, including for each feature, a mapping of one or more data sources that can be used to provide data relied on by the feature (e.g., a mapping of the "unsuccessful log-on key indicator" feature to "authentication server"). In some embodiments, the feature-data source mapping 156 can be based on known solutions and/or configurations, including solutions and/or configurations employed by other users and application deployments. For example, if it is determined that at least a threshold percentage of deployments of the application include populating the unsuccessful log-on key indicator feature using log-on data provided by a particular type of authentication application executing on an authentication server, then the unsuccessful log-on key indicator feature may be mapped to a condition that includes the particular type of authentication application executing on an authentication server. Thus, the mappings of features to conditions for an application may be determined based, for example, on crowd-sourced deployment information for the application. In some embodiments, the mapping 150 may also include a mapping of one or more suggestions or conditions for deploying the feature. For example, the unsuccessful log-on key indicator feature may be mapped to log-on data of an authentication server, and corresponding suggestions to configure the application to ingest log-on data, suggested instructions for configuring the application to ingest log-on data to ingest log-on data from an authentication server, a suggestion to download/purchase/install an application for ingesting log-on data from an authentication server, a link to locations with content to assist in configuring the application to ingest log-on data, and/or the like. A feature-data model mapping 158 may include a mapping of one or more available features 150 to one or more data models, including for each data model, a mapping of one or more features (e.g., a mapping of the "unsuccessful log-on key indicator" feature to "authentication" data model). Although certain embodiments are described with regard to a single data store 142 for the purpose of illustration, embodiments can include employing multiple data stores 142, such as one or more distributed data stores 142. Moreover, although certain embodiments are described with regard to a single application server 110 for the purpose of illustration, embodiments can include employing multiple application servers 110, such as one or more distributed application servers 110. In some embodiments, the application server 110 can include one or more computer systems similar to that of the computer system 1000 described below with regard to at least FIG. 4.

As noted above, the application server 110 may be in communication with one or more components of a back-end search system 120. In some embodiments, the back-end search system 120 can be similar to that of search system 1100 described in more detail below with regard to at least FIG. 5. For example, the back-end search system 120 can include one or more data sources ("sources") (e.g., sources 1105 of FIG. 5), one or more forwarders (e.g., forwarders 1101 of FIG. 5), one or more indexers (e.g., indexers 1102 of FIG. 5), one or more index data stores (e.g., data stores 1103 of FIG. 5), and/or one or more search heads (e.g., search head 1104 of FIG. 5). As described in more detail below with regard to at least FIGS. 5-11D, in the context of monitoring machine-generated data, forwarders may provide for collecting machine-generated data from one or more data sources, such as data streaming from packaged and custom applications, application servers, web servers, databases, wire data from networks, virtual machines, telecom equipment, operating systems, sensors, and/or the like. Indexers may provide for receiving, indexing, storing, and/or searching the machine-generated data received from the forwarders. Search heads may provide for servicing search requests (e.g., search requests received from the application server 110), including distributing search tasks to one or more indexers, receiving one or more search results from the one or more indexers and merging the search results received from the one or more indexers. A search head may provide the search results to the application server 110. In some embodiments, the application server 110 serves search results and reports to the client device 104 for presentation to the user 108. Although the application server 110 is illustrated as a component that is separate from the back-end search system 120 for the purpose of illustration, embodiments can include the application server 110 and/or its functionality being included in or integrated with one or more components of the back-end search system 120. For example, some or all of the components and functionality of the application server 110 can be integrated with or provided by a search head of the back-end, search system 120.

As described herein, the application 140 may include an enterprise application that includes one or more available features 150. The application 140 may deployed on the application server 110, and the deployment of the application can include configurations of the application itself, as well as related software and hardware. For example, a deployment of the application 140 can include the application and/or the search system. 120 being configured to receive machine-generated data from one or more data sources 122 (e.g., user log-on data from one or more authentication servers). In some embodiments, the application 140 can identify deployed features 152 (e.g., available features 150 that are deployed in a current deployment of the application 140), and un-deployed features 154 (e.g., available features 150 that are not deployed in a current deployment of the application 140). In some embodiments, the application 140 can serve GUI content 130 to the client device 104 for display to the user 108. In some embodiments, the feature profile GUI content 130 can include one or more interactive GUIs (e.g., an interactive deployment completeness GUI) that provide an indication of un-deployed features 154 and conditions or suggested courses of action to deploy the un-deployed features 154.

Figure 2A:
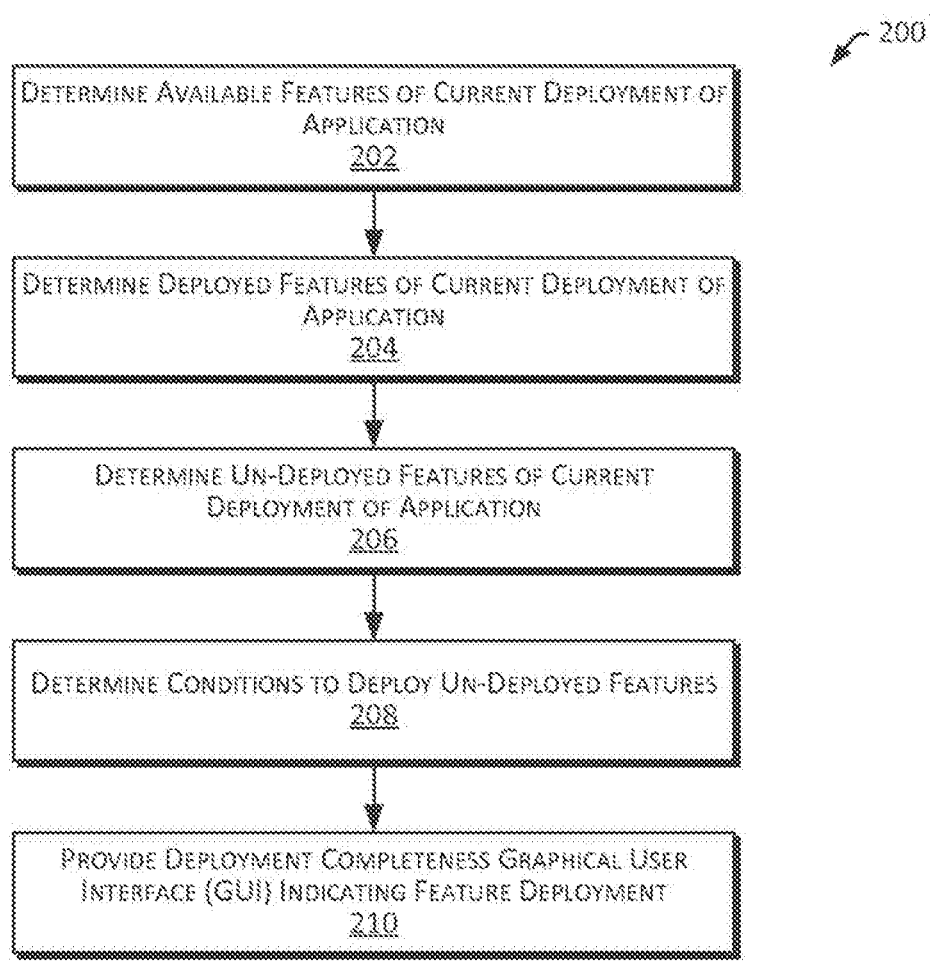
FIG. 2A is a flowchart that illustrates an example method for indicating deployment of application features in accordance with the disclosed embodiments.
Figure 2B:
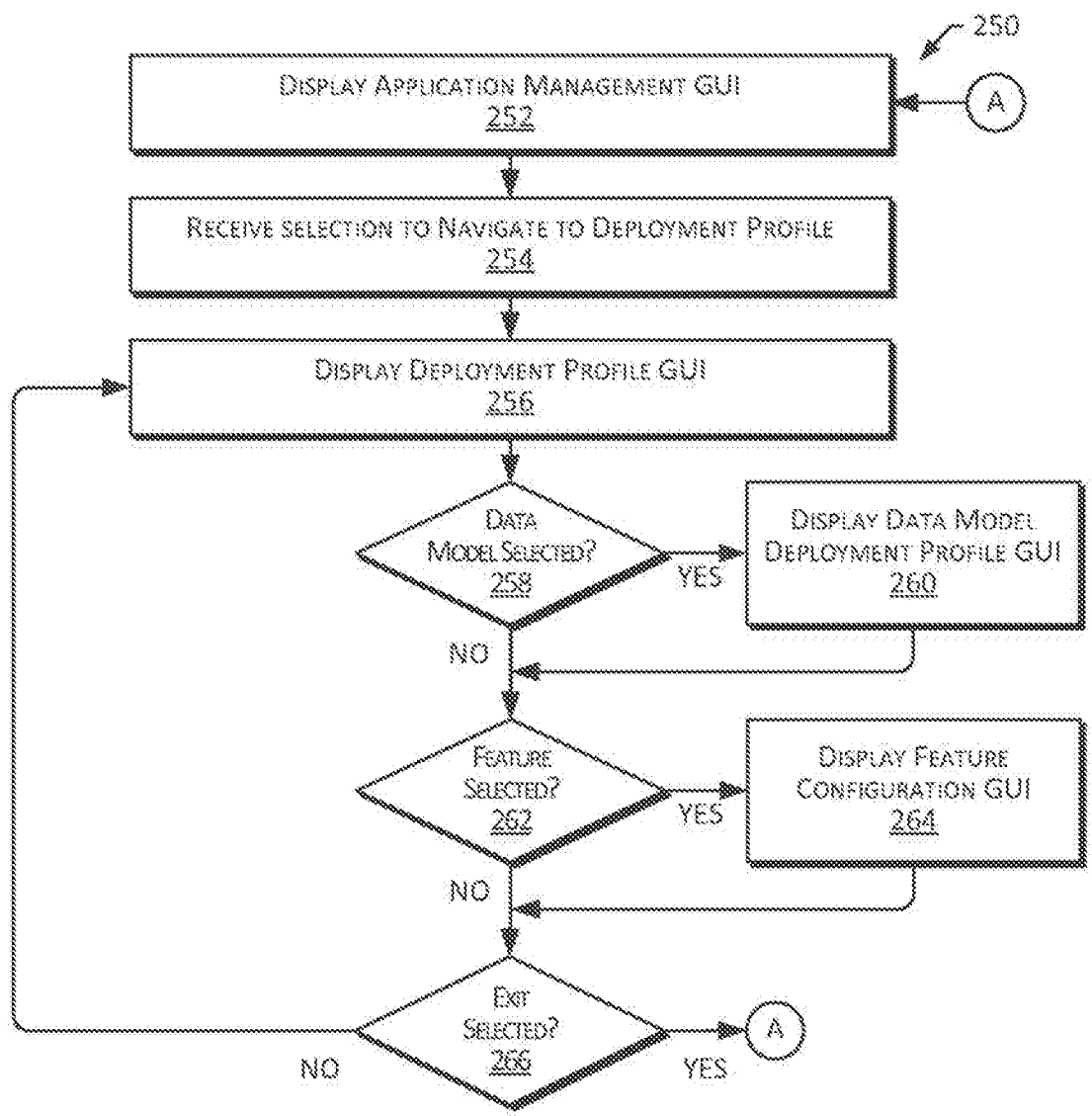
FIG. 2B is a flowchart that illustrates an example method for providing an interactive deployment completeness graphical user interface (GUI) in accordance with the disclosed embodiments.

FIGS. 2A and 2B are flowcharts that illustrate example methods for indicating deployment of application features in accordance with the disclosed embodiments. FIG. 2A is a flowchart that illustrates an example method 200 for indicating deployment of application features in accordance with the disclosed embodiments. FIG. 2B is a flowchart that illustrates an example method 250 for providing an interactive deployment completeness graphical user interface (GUI) indicating deployment of application features in accordance with the disclosed embodiments. FIGS. 3A-3E are illustrations of example GUIs in accordance with the disclosed embodiments.

Turning to FIG. 2A, the method 200 may generally include determining available features of a current deployment of an application (block 202), determining deployed features of the current deployment of the application (block 204), determining un-deployed features of the current deployment of the application (block 206), determining conditions to deploy the un-deployed features (block 208), and providing a deployment completeness GUI indicating feature deployment (block 210). In some embodiments some or all of the operations described with regard to method 200 can be performed by execution of the application 140 by the search server 102.

In some embodiments, determining available features of a current deployment of an application (block 202) can include determining available features of an application regardless of whether they are or are not currently deployed. That is, determining available features of a current deployment of an application can include determining all of the available features of an application. For example, determining available features of a current deployment of an ES enterprise application 140 may include identifying the unsuccessful log-on key indicator feature (e.g., for indicating a number of unsuccessful attempts to log-on to one of the organization's applications in the last 24 hours), the current user sessions key indicator feature (e.g., for indicating a number of current user sessions on the organization's network), a malware dashboard feature (e.g., for indicating a trend of malicious activity, such as a visualization including a rolling plot of a rate of infections of the company's system in the last week), and so forth. In some embodiments, determining available features of a current deployment of an application can include updating the listing of available features 150. For example, the unsuccessful log-on key indicator feature, the current user sessions key indicator feature, the malware dashboard feature, and so forth may be added to the list of available features 150.

In some embodiments, determining deployed features of the current deployment of the application (block 204) and/or determining un-deployed features of the current deployment of the application (block 206) can include determining, for each of some or all of the available features, whether the feature is properly configured to receive or is otherwise receiving the input data it needs to populate the associated content for the feature in the current deployment of the application. For example, with regard to an unsuccessful log-on key indicator, it may be determined that the feature is deployed in a current deployment of the application if it is properly configured to and/or is currently receiving log-on data in the current deployment of the application. Thus, for example, it may be determined that the unsuccessful log-on key indicator is deployed in the current deployment of the application if it is configured to receive log-on data and/or receiving log-on data (e.g., from one or more authentication servers) during use in the current deployment of the application. Conversely, it may be determined that the unsuccessful log-on key indicator feature is not deployed in the current deployment of the application if it is not properly configured to receive log-on data and/or is not receiving log-on data during use in the current deployment of the application. Thus, for example, it may be determined that the unsuccessful log-on key indicator is not deployed in the current deployment of the application if the current deployment of the application is not configured to receive log-on data and/or the log-on data is not being received during use in the current deployment of the application (e.g., in a scenario where, despite the application being configured properly to receive log-on data from an authentication server, the authentication server is not sending the log-on data).

As a further example, with regard to a current user sessions key indicator, it may be determined that the feature is deployed in a current deployment of the application if it is properly configured to and/or is currently receiving user session data in the current deployment of the application. Thus, for example, it may be determined that the current user sessions key indicator is deployed in the current deployment of the application if it is configured to receive user session data and/or receiving user sessions data (e.g., from one or more secure global desktop (SGD) servers) during use in the current deployment of the application. Conversely, it may be determined that the current user sessions key indicator feature is not deployed in the current deployment of the application if it is not properly configured to receive user sessions data and/or is not receiving user session data during use in the current deployment of the application. Thus, for example, it may be determined that the current user sessions indicator is not deployed in the current deployment of the application if the current deployment of the application is not configured to receive user session data and/or the user session data is not being received during use in the current deployment of the application (e.g., in a scenario where, despite the application being configured properly to receive user session data from an SGD server, the SGD server is not sending the log-on data).

In some embodiments, determining deployed features of the current deployment of the application and/or determining un-deployed features of the current deployment of the application can include updating the listings deployed features 152 and/or un-deployed features 154 accordingly. For example, if the current user sessions key indicator feature is determined to be deployed in the current deployment of the application 140, then the current user sessions key indicator feature can be added to the list of deployed features 152. As a further example, if the unsuccessful log-on key indicator feature is determined to be un-deployed in the current deployment of the application 140, then the unsuccessful log-on key indicator feature can be added to the list of un-deployed features 154. A similar determination and/or update can be performed for each of the available features 140. Thus, for example, each of the available features may be included in either the list of deployed features 152 or the list un-deployed features 154.

In some embodiments, determining conditions to deploy the un-deployed features (block 208) can include determining, for each of some or all of the un-deployed features 154, one or more conditions that may be satisfied to deploy the feature. For example, if the unsuccessful log-on key indicator feature is determined to be un-deployed in the current deployment of the application 140 because was determined that it is not configured to receive log-on data and/or the log-on data is not being received during use in the current deployment of the application, then the condition to deploy the feature may be determined to be configuring the application to receive log-on data from one or more data sources. In some embodiments, the condition may be a relatively high-level solution, such as receive log-on data from one or more data sources. This may be communicated, for example, to a user by simply providing an indication such as "Deploy Feature→Provide Log-on Data", or "To deploy the unsuccessful log-on key indicator feature, you need to configure your system to provide log-on data from one or more data sources." In some embodiments, the condition(s) may be a relatively detailed solution, such as receive log-on data from one or more authentication servers, download and install an add-on application (e.g., an authentication add-on application) that can receive log-on data from one or more authentication servers, contact a vendor (e.g., Oracle) to purchase software or hardware that can generate and provide log-on data, and/or the like. Although several example conditions are provided for the purpose of illustration, embodiments can include determining any suitable conditions for deploying an un-deployed feature.

In some embodiments, determining a condition to deploy an un-deployed feature can be based on a mapping of one or more conditions to the feature. The conditions or suggestions for deploying an un-deployed feature can include some or all of the conditions mapped to the feature. For example, if the feature-data source mapping 156 includes a mapping of the unsuccessful log-on key indicator feature to an input of log-on data, then the condition can simply include providing log-on data for use by the feature. In such an embodiment, a corresponding suggestion to the user 104 can include a suggestion that the user 104 configure their system 102 to provide log-on data for use by the feature. As a further example, if the feature-data source mapping 156 includes a mapping of the unsuccessful log-on key indicator feature to an input of log-on data from a particular data source, such as an authentication server, then the condition can include providing log-on data from the authentication server for use by the feature. In such an embodiment, a corresponding suggestion to the user 104 can include a more detailed suggestion that the user 104 configure their system 102 to provide log-on data from an authentication server for use by the feature. In accordance with the other examples described herein, suggestions to the user can correspond to any variety of conditions mapped to the feature, such as installing a free application, purchasing and installing a paid application, obtaining third party software or hardware, and/or the like. Such information can be provided, for example, in the deployment content 344 (e.g., accompanying a feature) as described in more detail below with regard to at least FIG. 3D.

In some embodiments, providing an interactive deployment completeness GUI (also referred to as a "feature management GUI") indicating feature deployment (block 210) can include providing an interactive dashboard that provides indications of deployed features, un-deployed features, deployed data models, and/or un-deployed data models for a current deployment of the application. In some embodiments, the dashboard can also indicate conditions or provide suggestions for courses of action that a user can take to deploy one or more un-deployed features. FIGS. 3A-3E are illustrations of example deployment completeness GUIs in accordance with the disclosed embodiments. The GUIs of FIGS. 3A-3E are discussed in more detail in conjunction with FIG. 2B, which is a flowchart that illustrates an example method 250 for providing an interactive deployment completeness GUI indicating feature deployment (e.g., block 210) in accordance with the disclosed embodiments.

Figure 3A:
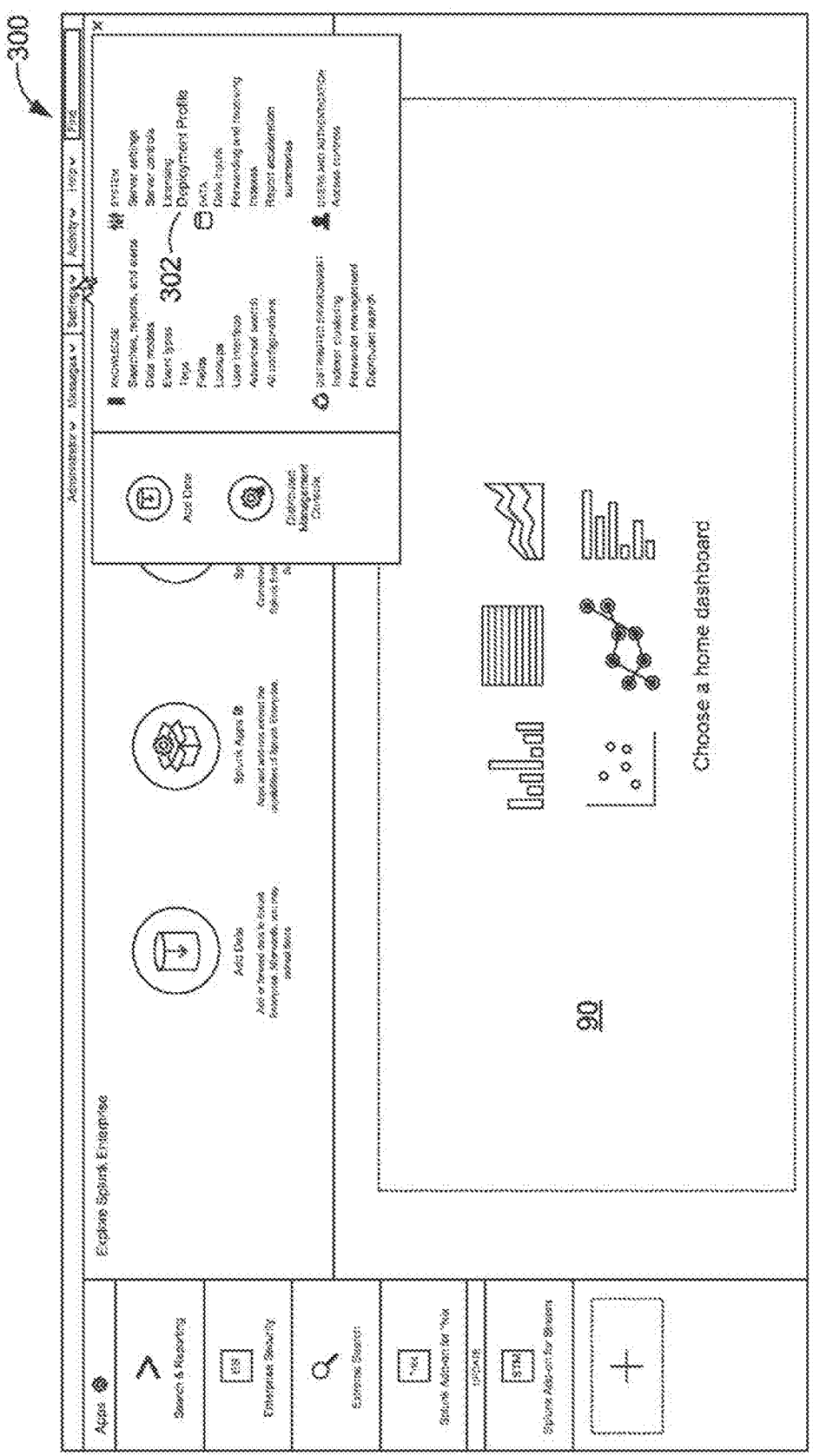
FIGS. 3A-3E are illustrations of example GUIs in accordance with the disclosed embodiments.
Figure 3B:
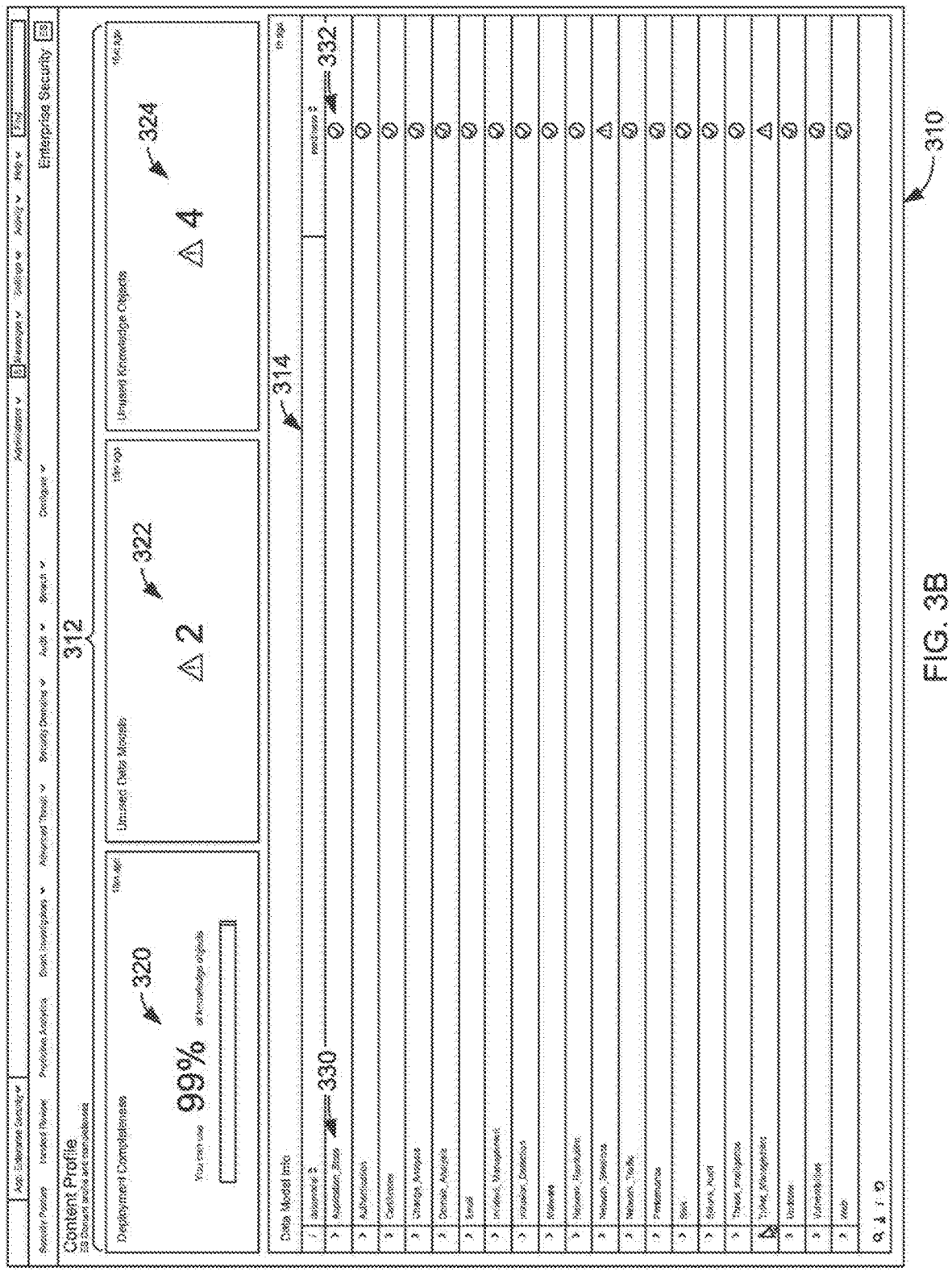

Referring to method 250 of FIG. 2B, in some embodiments, an application management GUI may be displayed (block 252). FIG. 3A illustrates an example application management GUI 300 in accordance with the disclosed embodiments. In some embodiments, the application management GUI 300 may be displayed, for example, as a result of the user 108 logging into his/her account with the system 102. In some embodiments, the application management GUI 300 includes a menu selection for "Settings" that, when selected, provides a drop-down menu displaying links to various destinations. The links may include a "Deployment Profile" link 302. Upon selection of the link 302 (e.g., a selection to navigate to a deployment profile) (block 254), a deployment profile overview GUI may be displayed (block 256). FIG. 3B illustrates an example deployment profile overview GUI 310 in accordance with the disclosed embodiments. As illustrated, the deployment profile overview GUI 310 may include deployment metrics 312 and a listing of data models 314. The deployment metrics 312 may include a feature deployment completeness metric 320, a data model deployment metric 322 and a feature (or "object") deployment metric 324.

The feature deployment completeness metric 320 can include display of a deployment percentage indicative of a percentage of the available features 150 that are deployed in a current deployment of the application. If, for example, there are 1000 available features and 990 of the features are deployed (with 10 of the available features being un-deployed), then the dashboard may display a deployment percentage value of 99%. In the illustrated embodiment, the feature deployment metric 324 includes a deployment percentage value of 99%, indicating that 99% of the features of the corresponding ES application are deployed in a current deployment of the corresponding ES application. In some embodiments, the deployment completeness metric 320 can include other visualizations in place of or in conjunction with the displayed value. For example, in the illustrated embodiment, the displayed value of 99% is accompanied by a progress bar indicating that 99% of the features of the corresponding ES application are deployed in a current deployment of the corresponding ES application.

In some embodiments, the data model deployment metric 322 indicates a number of un-deployed data models in a current deployment of the application. If, for example, there are 100 available data models and 99 of the data models are deployed (with 1 of the available features being un-deployed), then the dashboard may display a value of 1. In the illustrated embodiment, the data model deployment metric 322 has a value of 2, indicating that there are 2 un-deployed data models in the current deployment of the corresponding ES application. In some embodiments, the data model deployment metric 322 can include other visualizations displayed in place of or in conjunction with a displayed value. For example, in the illustrated embodiment, the displayed value of 2 is accompanied by a status indicator including a triangular yellow warning sign (e.g., a warning tick), indicating that at least one of the data models of the corresponding ES application is un-deployed in a current deployment of the corresponding ES application. If the all of the data models are deployed, for example, the value may be "0" and the status indicator may include a green circle (e.g., an OK tick) with a check mark indicating that all of the data models of the corresponding ES application are deployed in a current deployment of the corresponding ES application.

In some embodiments, the feature (or "object") deployment metric 324 indicates a number of the un-deployed features in a current deployment of the application. If, for example, there are 1000 available features and 990 of the features are deployed (with 10 of the available features being un-deployed), then the dashboard may display a value of 10. In the illustrated embodiment, the feature deployment metric 324 has a value of 4, indicating that there are 4 un-deployed features in the current deployment of the corresponding ES application. In some embodiments, the feature deployment metric 324 can include other visualizations displayed in place of or in conjunction with a displayed value. For example, in the illustrated embodiment, the displayed value of 4 is accompanied by a status indicator including a triangular yellow warning sign (e.g., a warning tick), indicating that at least one of the features of the corresponding ES application is un-deployed in a current deployment of the corresponding ES application. If the all of the features are deployed, for example, the value may be "0" and the status indicator may include a green circle (e.g., an OK tick) with a check mark indicating that all of the features of the corresponding ES application are deployed in a current deployment of the corresponding ES application.

In some embodiments, the listing of data models 314 can include an interactive listing of data models 330 associated with the application. Each row of the listing may correspond to a different data model (e.g., the "Application state" data model, the "Authentication" data model, and so forth). Each row may include a corresponding data model status indicator 332. The data model status indicator 332 may indicate whether the corresponding data model is deployed or un-deployed. In some embodiments, a data model that is deployed may be accompanied by a corresponding data model status indicator 332 including a green circle (e.g., a OK tick) with a check mark indicating that all of the features mapped to the data model are deployed in a current deployment of the corresponding application. In some embodiments, a data model that is un-deployed may be accompanied by a corresponding data model status indicator 332 including a triangular yellow warning sign (e.g., a warning tick), indicating that all of the features mapped to the data model are un-deployed in a current deployment of the corresponding application. For example, in the illustrated embodiment, the data model status indicator 332 for each of the "Network_Sessions" data model and the "Ticket Management" data model include warning ticks indicating that the features mapped to the respective data models are un-deployed in the current deployment of the corresponding ES application. Further, in the illustrated embodiment, the data model status indicator 332 for each of the other data models displayed (e.g., the "Application state" data model, the "Authentication" data model, and so forth) include OK ticks indicating that some or all of the features mapped to the respective data models are deployed the current deployment of the corresponding ES application.

Figure 3C:
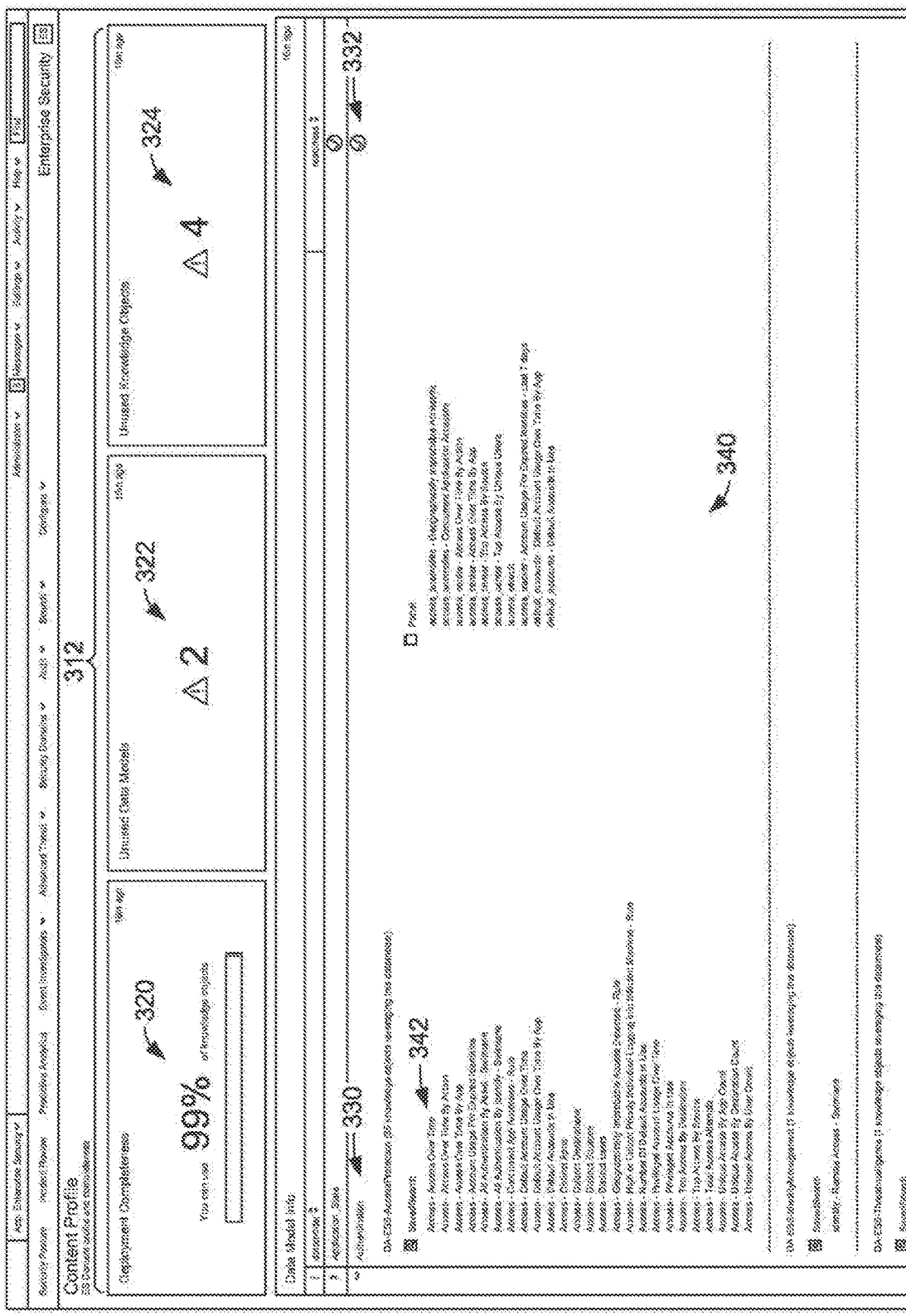

Referring again to method 250 of FIG. 2B, method 200 may include displaying a data model deployment profile GUI (block 260) in response to selection of a data model (block 258). For example, each of the data models 330 of the interactive listing of data models 314 may be interactive elements that are user selectable to navigate to a data model deployment profile. FIG. 3C illustrates an example in which the "Authentication" data model 330 has been selected to expand the element to display a corresponding data model deployment profile GUI 340 in accordance with the disclosed embodiments. In some embodiments, the deployment profile GUI 340 includes a listing of the features of the application mapped to the data model 330. In some embodiments, the features may be grouped based on one or more shared characteristics, such as their type (e.g., search, panel, and/or the like), groupings they are associated with (e.g., DA-ESS-AccessProtection, DA-ES S-Identity Management, and/or the like). In the illustrated embodiment, the deployment profile GUI 340 includes a listing that includes features 342 of "Access—Access Over Time", "Access—Access Over Time by Action", and so forth. In some embodiments, a user can scroll down to see all of the features for a data model 330 if they are not immediately visible in the deployment profile GUI 340. As described herein, each of the features 342 may be associated with input data and/or a data source. For example, the "Access—Access Over Time" feature may be associated with access data received, for example, from individual user computer data sources 122.

Figure 3D:
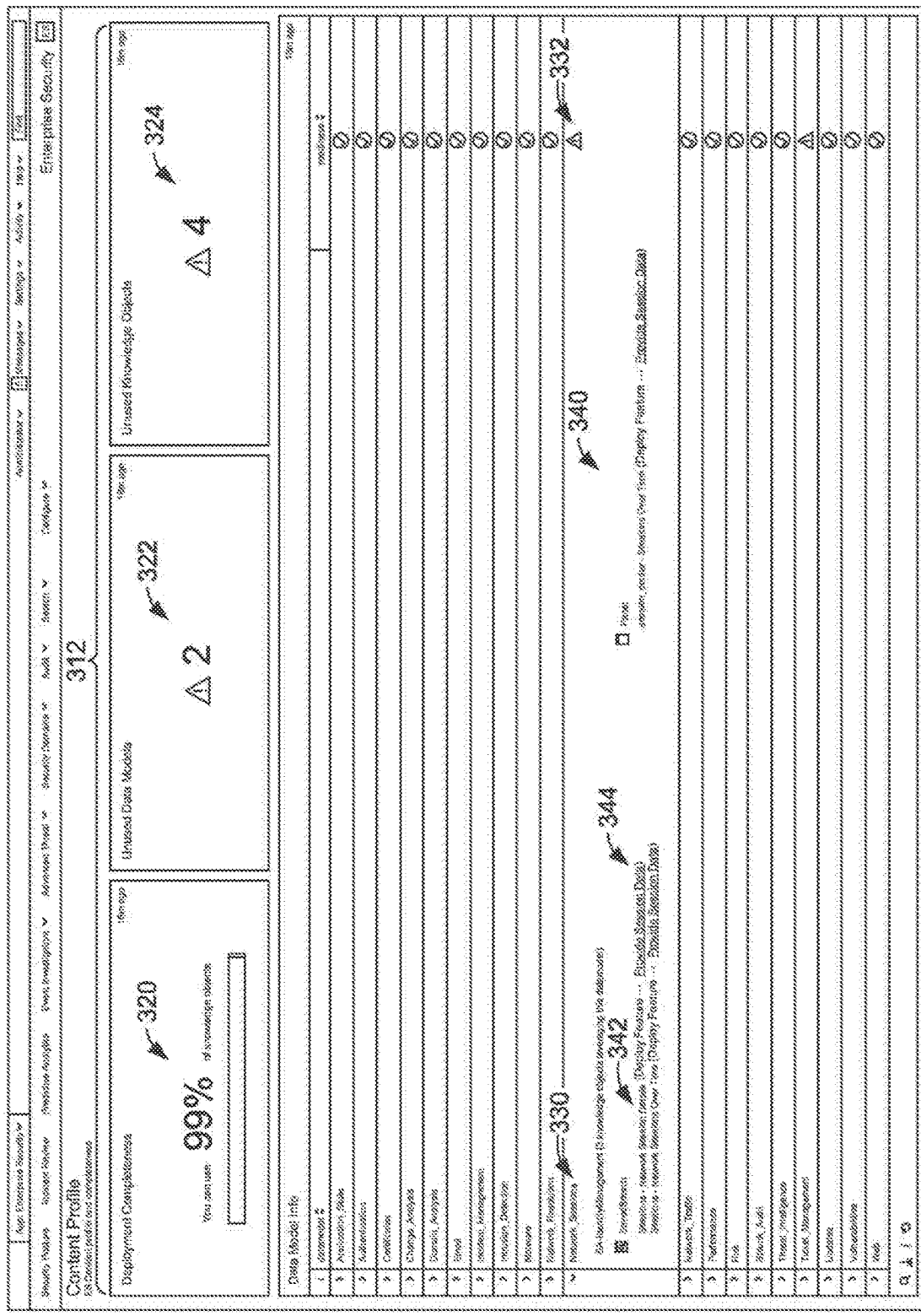

Notably, the "Authentication" data model is a deployed data model. In some embodiments, a data model deployment profile GUI 340 for an un-deployed data model 300, such as "Network_Sessions" data model may include additional information, such as content that indicates conditions or provides suggestions for deploying one or more of the features of the data model 300. FIG. 3D illustrates an example in which the "Network Sessions" data model 330 has been selected to display a corresponding data model deployment profile GUI 340 in accordance with the disclosed embodiments.

In some embodiments, un-deployed features 342 can be accompanied by deployment content 344. The deployment content 344 can include information (e.g., conditions or suggestions) that indicates one more ways to deploy the currently un-deployed feature 342. The deployment content 344 can include, for example, content or links to content that provides instructions for configuring the application to intake data relied on by the un-deployed feature, installing an application to intake data relied on by the un-deployed feature, purchasing additional software or hardware needed to intake data relied on by the un-deployed feature, configuring hardware for the data source such that it can provide the data relied on by the un-deployed feature, and/or the like. The conditions or suggestions for deploying an un-deployed feature can be determined, for example, based on the feature-data source mapping 156 as described above with regard to at least block 208 of method 200.

In the illustrated embodiment, the "Sessions—Network Session Details" may be an un-deployed feature 342 of the Network Sessions data model 330. It may be determined that the Sessions—Network Session Details feature 342 uses session data to populate corresponding content displayed by the feature (e.g., as described above with regard to at least block 208 of method 200). Accordingly, the feature 342 may be accompanied by deployment content 344 that includes a statement of "Deploy Feature Provide Session. Data", thereby indicating to the user 108 that, to deploy the feature 342, they should to configure the system 102 to intake session data, or otherwise provide session data for use by the feature 342. As described herein, the deployment content can include any content, or even a link to content, that can assist the user 108 in deploying the feature 342. For example, if it is determined that session data is can be obtained from SGD servers, the deployment content 344 may include a corresponding description (e.g., "You can obtain session data from SGD servers), a link to instructions for configuring the application 140 to intake session data from SOD servers, a link to a an add-on application that can be installed with the application 140 to enable the application 140 to intake session data from SOD servers, a link to sites for purchasing or otherwise obtaining software and/or hardware that can be used to configure the application 140 to intake session data from SOD servers, and/or the like. Thus, the deployment content 344 can include conditions or suggestions that indicate one or more courses of action that can be taken to deploy the feature 342.

Figure 3E:
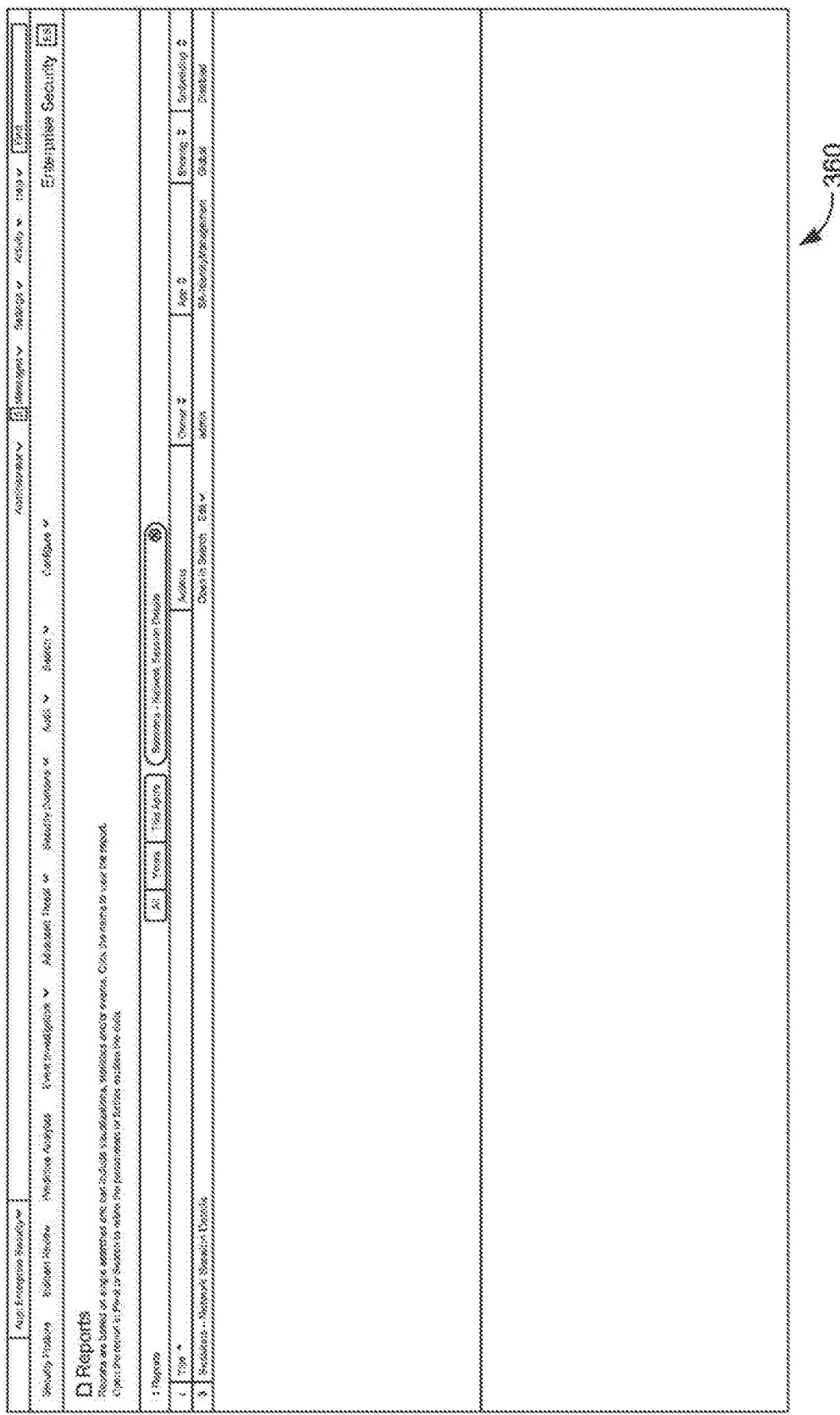

Referring again to method 250 of FIG. 2B, method 250 may include displaying a feature configuration GUI (block 264) in response to selection of a feature (block 262). For example, each of the features 342 of data model deployment profile GUI 340 may include a link that is user selectable to navigate to a corresponding feature configuration GUI. A feature configuration GUI for a feature 342 may enable the user 108 to review and/or edit the configuration of the feature 342. FIG. 3E illustrates an example feature configuration GUI 360 in accordance with the disclosed embodiment. The illustrated feature configuration GUI 360 may be displayed in response to a user selecting the Sessions—Network Session Details feature 342 feature 342 of the Network_Sessions data model deployment profile GUI 340 of FIG. 3D. The illustrated feature configuration GUI 360 may include a feature configuration GUI 360 for the Sessions Network Session Details feature 342. Such a feature configuration GUI 360 for the Sessions—Network Session Details feature 342 may be displayed, for example, in response to the user 108 selecting the Sessions Network Session Details feature 342 of the expanded data model deployment profile GUI 340 for the Network Sessions data model 300 illustrated in FIG. 3D. The feature configuration. GUI 360 may provide various information about the feature 342, such as the title, available action (e.g., open in search, edit, and/or the like), an owner, an application (or group) that the feature is associated with, and/or the like. In some embodiments, selection of the title may enable the user to drill-down to obtain further details about the feature, such as an expanded view for reviewing or editing the underlying search used to find the data used to populate the feature 342. Thus, a user 108 may be able to easily navigate to a GUI for reviewing and editing a feature 342 by simply selecting the feature 342 in the data model deployment profile GUI 340.

If a selection or other request is made to exit the deployment profile overview GUI 310 (block 266) (e.g., by selecting the "Enterprise Security" link in the upper right hand corner of the screen), the method 250 may return to displaying the application management GUI 300 (block 252).

Figure 4:
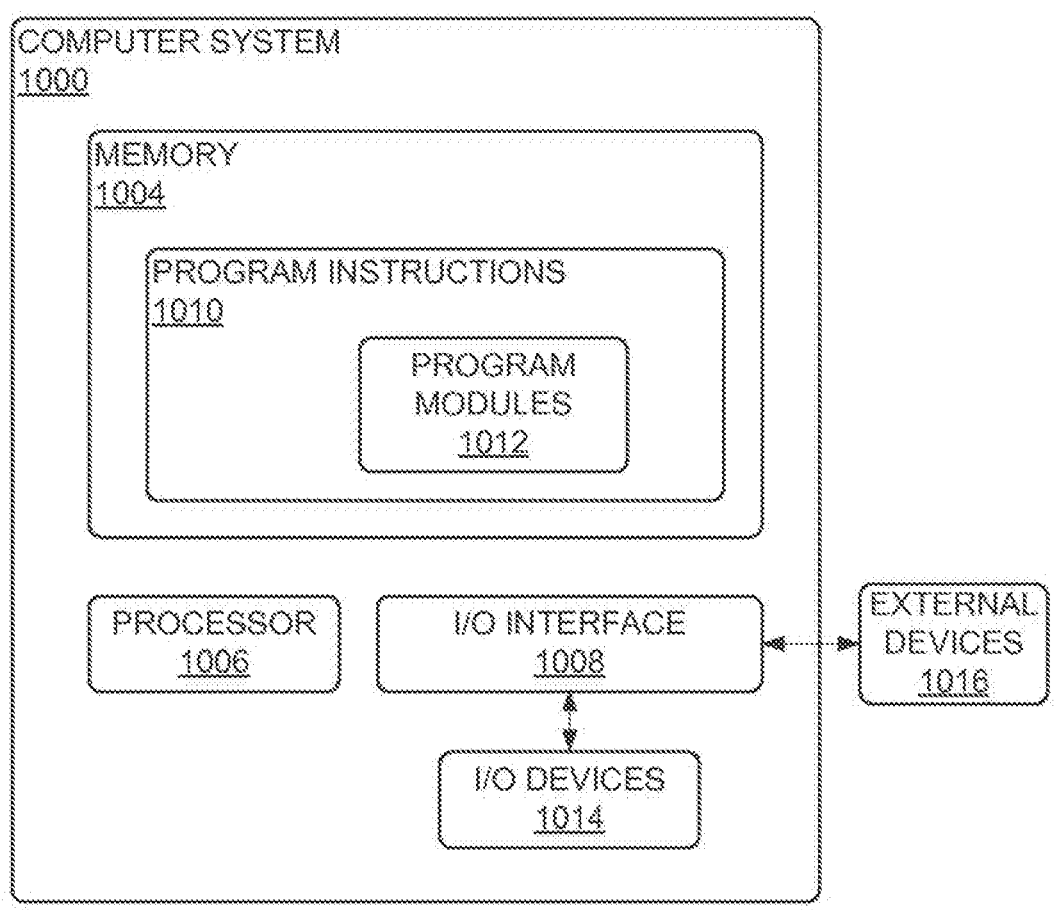
FIG. 4 is a diagram that illustrates an example computer system in accordance with the disclosed embodiments.

FIG. 4 is a diagram that illustrates an example computer system 1000 in accordance with one or more embodiments. In some embodiments, the computer system 1000 may include a memory 1004, a processor 1006, and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), bulk storage memory (e.g., CD-ROM and/or DVD-ROM, hard drives), and/or the like. The memory 1004 may include a non-transitory computer-readable storage medium having program instructions 1010 stored therein. The program instructions 1010 may include program modules 1012 that are executable by a computer processor (e.g., the processor 1006) to cause the functional operations described herein, including, for example, one or more of the methods 200 and/or 250. In the context of a computer system of the client device 106, the program modules 1012 may include one or more modules for performing some or all of the operations described with regard to the client device 106. In the context of a computer system of the application server 110, the program modules 1012 may include a one or more modules (e.g., the enterprise application module 140) for performing some or all of the operations described with regard to the application server 110 and/or the application 140.

The processor 1006 may be any suitable processor capable of executing/performing program instructions. The processor 1006 may include a central processing unit (CPU) that carries out program instructions (e.g., the program instructions of the program module(s) 1012) to perform the arithmetical, logical, and input/output operations described herein. The processor 1006 may include one or more processors. The I/O interface 1008 may provide an interface for communication with one or more 11/0 devices 1014, such as a joystick, a computer mouse, a keyboard, a display screen (e.g., an electronic display for displaying a graphical user interface (GUI)), and/or the like. The I/O devices 1014 may include one or more of the user input devices. The I/O devices 1014 may be connected to the I/O interface 1008 via a wired or a wireless connection. The I/O interface 1008 may provide an interface for communication with one or more external devices 1016, such as other computers, networks, and/or the like. In some embodiments, the I/O interface 1008 may include an antenna, transceiver, and/or the like.

Accordingly, provided in some embodiments are systems and methods for indicating deployment of application features. As described herein, in some embodiments, an application can include one or more available features that can be deployed, a determination can be made as to which of the available features are deployed or un-deployed in a current deployment of the application, and an indication of the un-deployed and/or un-deployed features can be provided, for example, via an interactive deployment completeness GUI including an interactive dashboard. Such indications may enable a user to easily determine, for example, what features are and are not properly setup for use in the application in view of how the application is currently configured. In some embodiments, the features can employ machine-generated data and searches of the data that employ a late binding schema. For example, the features can include visualizations (e.g., metrics, graphs, and/or the like) or other objects that are based on underlying data contained in events of machine-generated data. A feature that indicates unsuccessful user log-on attempts may employ an underlying search of machine-generated data for events generated by authentication servers that indicate unsuccessful user log-on attempts, and can use those events to determine a metric, such as a number unsuccessful log-on attempts in the last 24 hours, that is displayed to a user by the feature. Such a search may employ, for example, a late-binding schema to identify one or more event records of a set of indexed event records that each include a portion of raw-machine-generated data and are each time-stamped or otherwise associated with a particular time. At least the following sections describe an example data system that may employ the described embodiments, including employing one or more searches of machine-generated data that can be employed in conjunction with the above described techniques.

1.1 Overview of Example Performance Data System

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a pre-defined format. This means that unstructured data can comprise various data items having different data types that can reside at different locations. For example, when the data source is an operating system log, an event can include one or more lines from the operating system log containing raw data that can include different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements, and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

Figure 5:
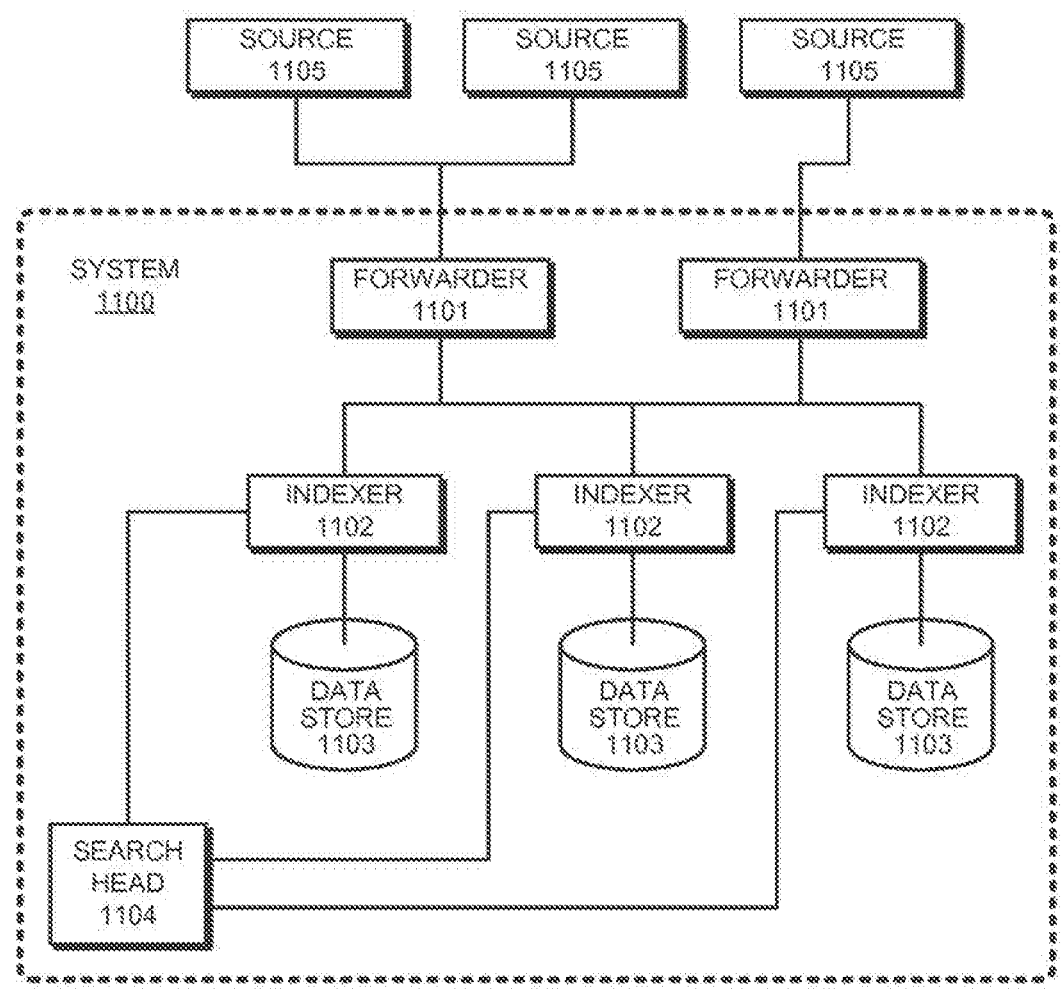
FIG. 5 presents a block diagram of an example event-processing system in accordance with the disclosed embodiments.

FIG. 5 presents a block diagram of an exemplary event-processing system 1100, similar to the SPLUNK® ENTERPRISE system. System 1100 includes one or more forwarders 1101 that collect data obtained from a variety of different data sources 1105, and one or more indexers 1102 that store, process, and/or perform operations on this data, wherein each indexer operates on data contained in a specific data store 1103. These forwarders and indexers can comprise separate computer systems in a data center, or may alternatively comprise separate processes executing on various computer systems in a data center.

During operation, the forwarders 1101 identify which indexers 1102 will receive the collected data and then forward the data to the identified indexers. Forwarders 1101 can also perform operations to strip out extraneous data and detect timestamps in the data. The forwarders 1101 next determine which indexers 1102 will receive each data item and then forward the data items to the determined indexers 1102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 1100 and the processes described below with respect to FIGS. 5-9 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

Figure 6:
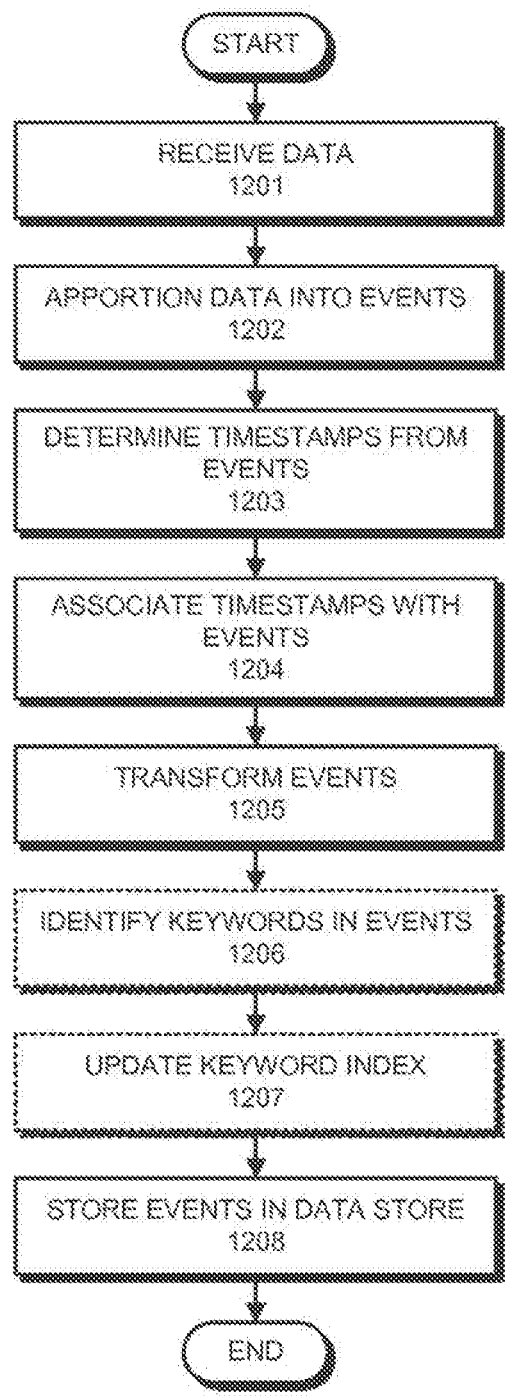
FIG. 6 presents a flowchart illustrating an example of how indexers process, index, and store data received from forwarders in accordance with the disclosed embodiments.

FIG. 6 presents a flowchart illustrating how an indexer processes, indexes, and stores data received from forwarders in accordance with the disclosed embodiments. At block 1201, the indexer receives the data from the forwarder. Next, at block 1202, the indexer apportions the data into events. Note that the data can include lines of text that are separated by carriage returns or line breaks, and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces, or line breaks. In some cases, a user can fine-tune or configure the rules that the indexers use to determine event boundaries in order to adapt the rules to the user's specific requirements.

Next, the indexer determines a timestamp for each event at block 1203. As mentioned above, these timestamps can be determined by extracting the time directly from the data in the event, or by interpolating the time based on timestamps from temporally proximate events. In some cases, a timestamp can be determined based on the time the data was received or generated. The indexer subsequently associates the determined timestamp with each event at block 1204, for example, by storing the timestamp as metadata for each event.

Then, the system can apply transformations to data to be included in events at block 1205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in events in block 1206. Then, at block 1207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or a colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 1208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 1102 is responsible for storing and searching a subset of the events contained in a corresponding data store 1103. By distributing events among the indexers and data stores, the indexers can analyze events for a query in parallel, for example, using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on Apr. 30, 2014, and in U.S. patent application Ser. No. 14/266,817 also filed on Apr. 30, 2014, which are hereby incorporated by reference.

1.4 Query Processing

Figure 7:
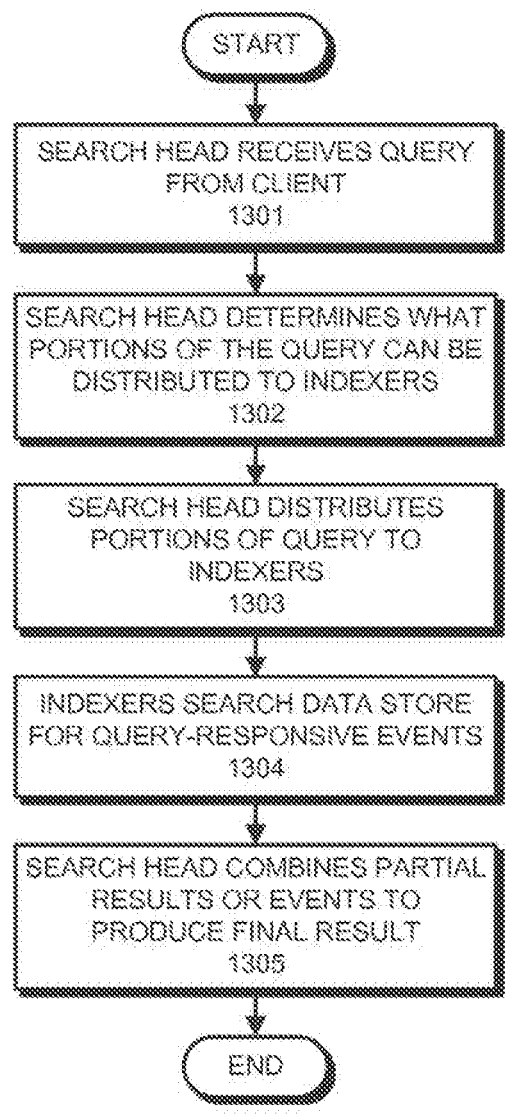
FIG. 7 presents a flowchart illustrating an example of how a search head and indexers perform a search query in accordance with the disclosed embodiments.

FIG. 7 presents a flowchart illustrating how a search head and indexers perform a search query in accordance with the disclosed embodiments. At the start of this process, a search head receives a search query from a client at block 1301. Next, at block 1302, the search head analyzes the search query to determine what portions can be delegated to indexers and what portions need to be executed locally by the search head. At block 1303, the search head distributes the determined portions of the query to the indexers. Note that commands that operate on single events can be trivially delegated to the indexers, while commands that involve events from multiple indexers are harder to delegate.

Then, at block 1304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 1304 may involve using the late-binding schema to extract values for specified fields from events at the time the query is processed. Next, the indexers can either send the relevant events back to the search head, or use the events to calculate a partial result, and send the partial result back to the search head.

Finally, at block 1305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by the system 1100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these settings to query the indexers to obtain a superset of the eventual results. Then, during a filtering stage, the search head can perform field-extraction operations on the superset to produce a reduced set of search results.

1.5 Field Extraction

Figure 8:
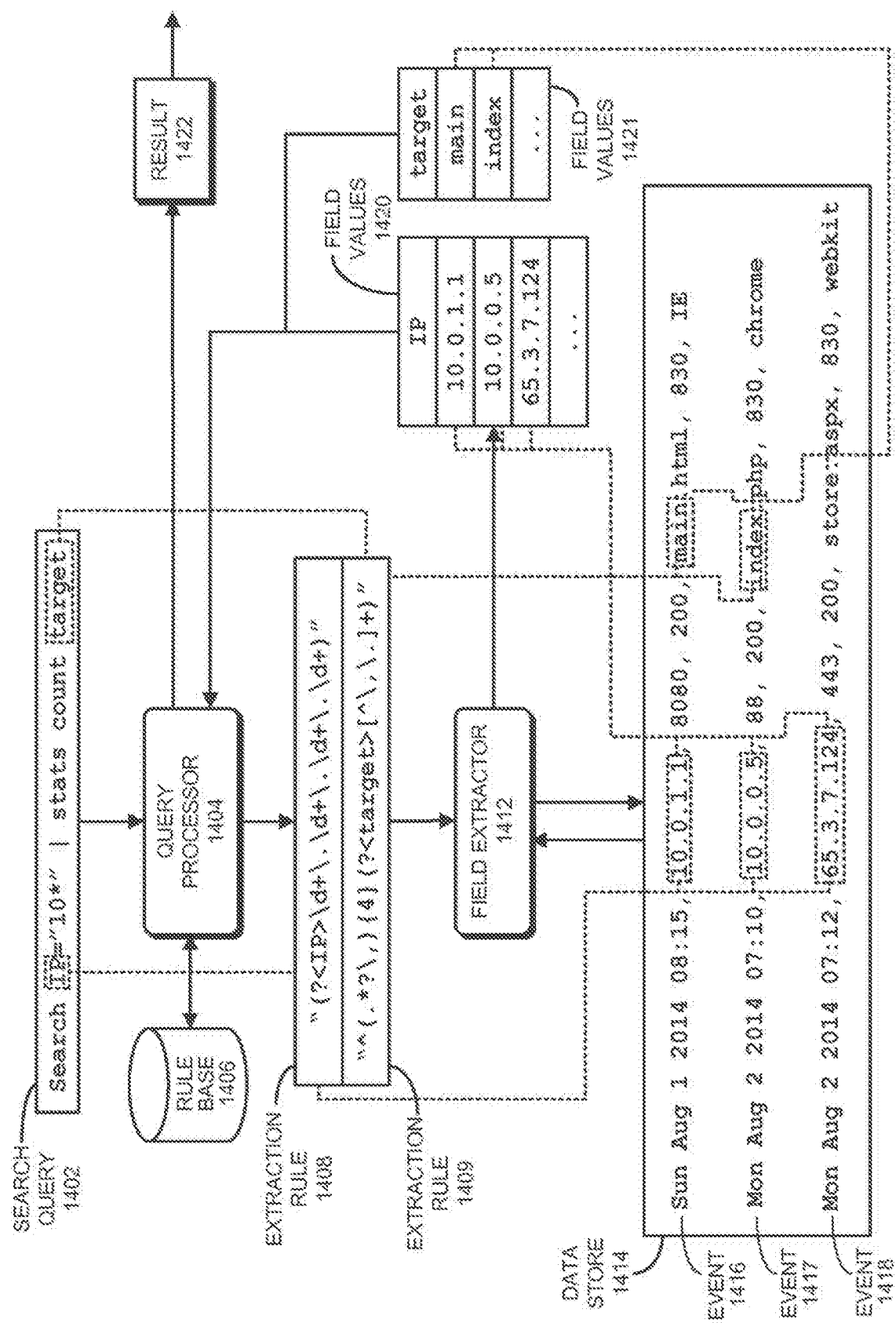
FIG. 8 presents a block diagram of an example system for processing search requests that uses extraction rules for field values in accordance with the disclosed embodiments.

FIG. 8 presents a block diagram illustrating how fields can be extracted during query processing in accordance with the disclosed embodiments. At the start of this process, a search query 1402 is received at a query processor 1404. Query processor 1404 includes various mechanisms for processing a query, wherein these mechanisms can reside in a search head 1104 and/or an indexer 1102. Note that the exemplary search query 1402 illustrated in FIG. 8 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 1402 can also be expressed in other query languages, such as the Structured Query Language (SQL) or any suitable query language.

Upon receiving search query 1402, query processor 1404 sees that search query 1402 includes two fields "IP" and "target." Query processor 1404 also determines that the values for the "IP" and "target" fields have not already been extracted from events in data store 1414, and consequently determines that query processor 1404 needs to use extraction rules to extract values for the fields. Hence, query processor 1404 performs a lookup for the extraction rules in a rule base 1406, wherein the rule base 1406 maps field names to corresponding extraction rules and obtains extraction rules 1408-1409, wherein extraction rule 1408 specifies how to extract a value for the "IP" field from an event, and extraction rule 1409 specifies how to extract a value for the "target" field from an event. As is illustrated in FIG. 8, extraction rules 1408-1409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or a value retrieved by the extraction rule. For example, a transformation rule may truncate a character string, or convert the character string into a different data format. In some cases, the query itself can specify one or more extraction rules.

Next, query processor 1404 sends extraction rules 1408-1409 to a field extractor 1412, which applies extraction rules 1408-1409 to events 1416-1418 in a data store 1414. Note that data store 1414 can include one or more data stores, and extraction rules 1408-1409 can be applied to large numbers of events in data store 1414, and are not meant to be limited to the three events 1416-1418 illustrated in FIG. 8. Moreover, the query processor 1404 can instruct field extractor 1412 to apply the extraction rules to all of the events in a data store 1414, or to a subset of the events that have been filtered based on some criteria.

Next, field extractor 1412 applies extraction rule 1408 for the first command "Search IP="10*"" to events in data store 1414 including events 1416-1418. Extraction rule 1408 is used to extract values for the IP address field from events in data store 1414 by looking for a pattern of one or more digits, followed by a period, followed again by one or more digits, followed by another period, followed again by one or more digits, followed by another period, and followed again by one or more digits. Next, field extractor 1412 returns field values 1420 to query processor 1404, which uses the criterion IP="10*" to look for IP addresses that start with "10". Note that events 1416 and 1417 match this criterion, but event 1418 does not, so the result set for the first command is events 1416-1417.

Query processor 1404 then sends events 1416-1417 to the next command "stats count target." To process this command, query processor 1404 causes field extractor 1412 to apply extraction rule 1409 to events 1416-1417. Extraction rule 1409 is used to extract values for the target field for events 1416-1417 by skipping the first four commas in events 1416-1417, and then extracting all of the following characters until a comma or period is reached. Next, field extractor 1412 returns field values 1421 to query processor 1404, which executes the command "scats count target" to count the number of unique values contained in the target fields, which in this example produces the value "2" that is returned as a final result 1422 for the query.

Note that the query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or a chart, generated from the values.

1.6 Exemplary Search Screen

Figure 10A:
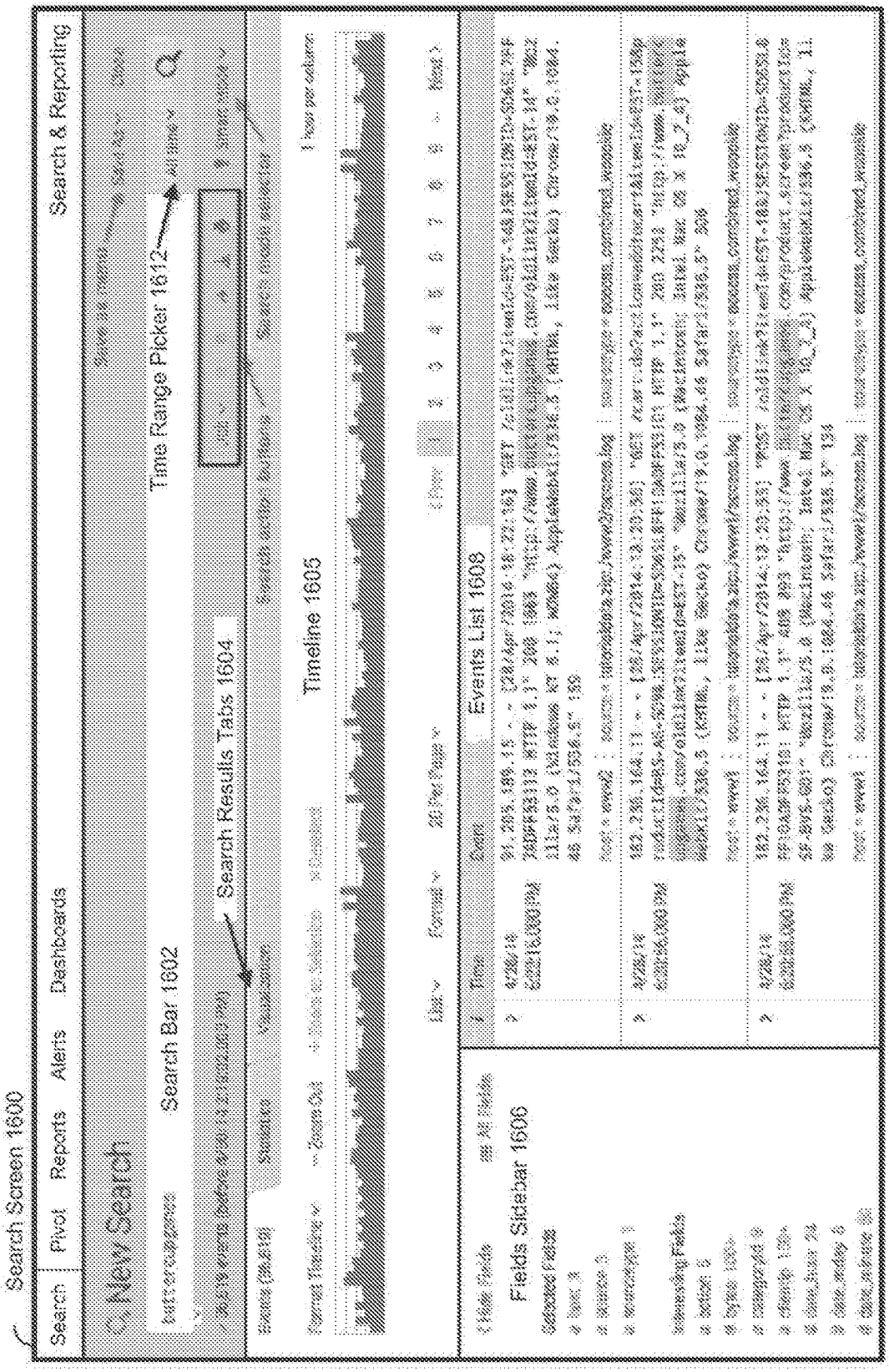
FIG. 10A illustrates an example search screen in accordance with the disclosed embodiments.
Figure 10B:
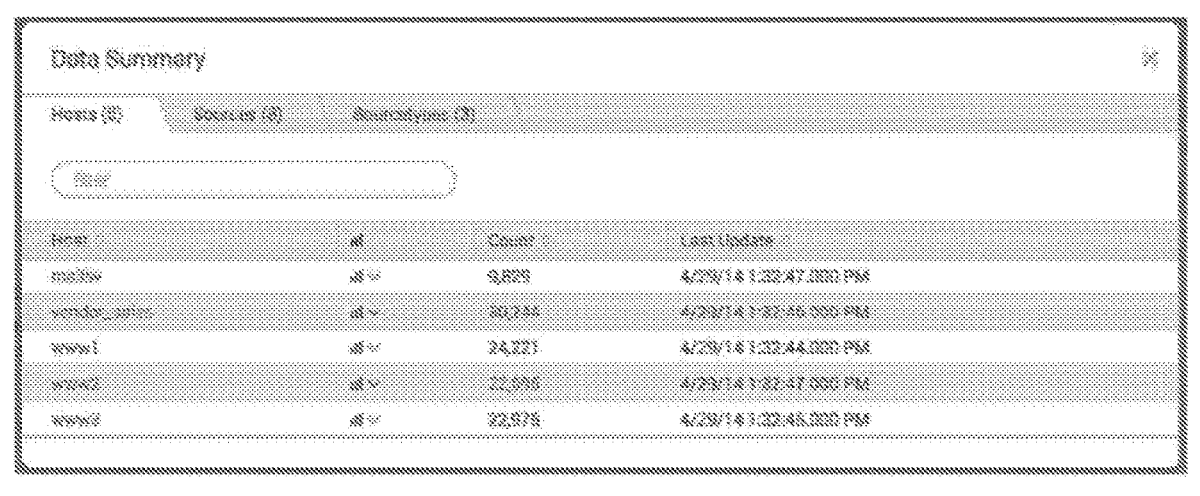

FIG. 10A illustrates an exemplary search screen 1600 in accordance with the disclosed embodiments. Search screen 1600 includes a search bar 1602 that accepts user input in the form of a search string. It also includes a time range picker 1612 that enables the user to specify a time range for the search. For "historical searches," the user can select a specific time range, or alternatively a relative time range, such as "today," "yesterday," or "last week." For "real-time searches," the user can select the size of a preceding time window to search for real-time events. Search screen 1600 also initially displays a "data summary" dialog as is illustrated in FIG. 10B that enables the user to select different sources for the event data, for example, by selecting specific hosts and log files.

After the search is executed, the search screen 1600 can display the results through search results tabs 1604, wherein search results tabs 1604 include: an "events tab" that displays various information about events returned by the search; a "statistics tab" that displays statistics about the search results; and a "visualization tab" that displays various visualizations of the search results. The events tab illustrated in FIG. 10A displays a timeline graph 1605 that graphically illustrates the number of events that occurred in one-hour intervals over the selected time range. It also displays an events list 1608 that enables a user to view the raw data in each of the returned events. It additionally displays a fields sidebar 1606 that includes statistics about occurrences of specific fields in the returned events, including "selected fields" that are preselected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

To facilitate faster query processing, a query can be structured as a map-reduce computation, wherein the "map"

operations are delegated to the indexers, while the corresponding "reduce" operations are performed locally at the search head. For example, FIG. 9 illustrates how a search query 1501 received from a client at search head 1104 can split into two phases, including: (1) a "map phase" comprising subtasks 1502 (e.g., data retrieval or simple filtering) that may be performed in parallel and are "mapped" to indexers 1102 for execution, and (2) a "reduce phase" comprising a merging operation 1503 to be executed by the search head when the results are ultimately collected from the indexers.

During operation, upon receiving search query 1501, search head 1104 modifies search query 1501 by substituting "stats" with "prestats" to produce search query 1502, and then distributes search query 1502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 5, or may alternatively distribute a modified version (e.g., a more restricted version) of the search query to the search peers. In this example, the indexers are responsible for producing the results and sending them to the search head. After the indexers return the results to the search head, the search head performs the merging operations 1503 on the results. Note that by executing the computation in this way, the system effectively distributes the computational operations while minimizing data transfers.

1.7.2 Keyword Index

As described above with reference to the flowcharts in FIGS. 6 and 7, the event-processing system 1100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of the system 1100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014, which is hereby incorporated by reference.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether the generation of updated reports can be accelerated by creating intermediate summaries. (This is possible if results from preceding time periods can be computed separately and combined to generate an updated report. In some cases, it is not possible to combine such incremental results, for example, where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that matches the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on. Nov. 19, 2013, and U.S. Pat. No. 8,412,696, issued on Apr. 2, 2011, which are hereby incorporated by reference.

1.8 Security Features

The SPUNK® ENTERPRISE platform provides various schemas, dashboards, and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SKUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volumes, uniform resource locator strings, and source addresses. The process of detecting security threats for network-related information is further described in U.S. patent application Ser. Nos. 13/956,252 and 13/956,262, which are hereby incorporated by reference. Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 11A:
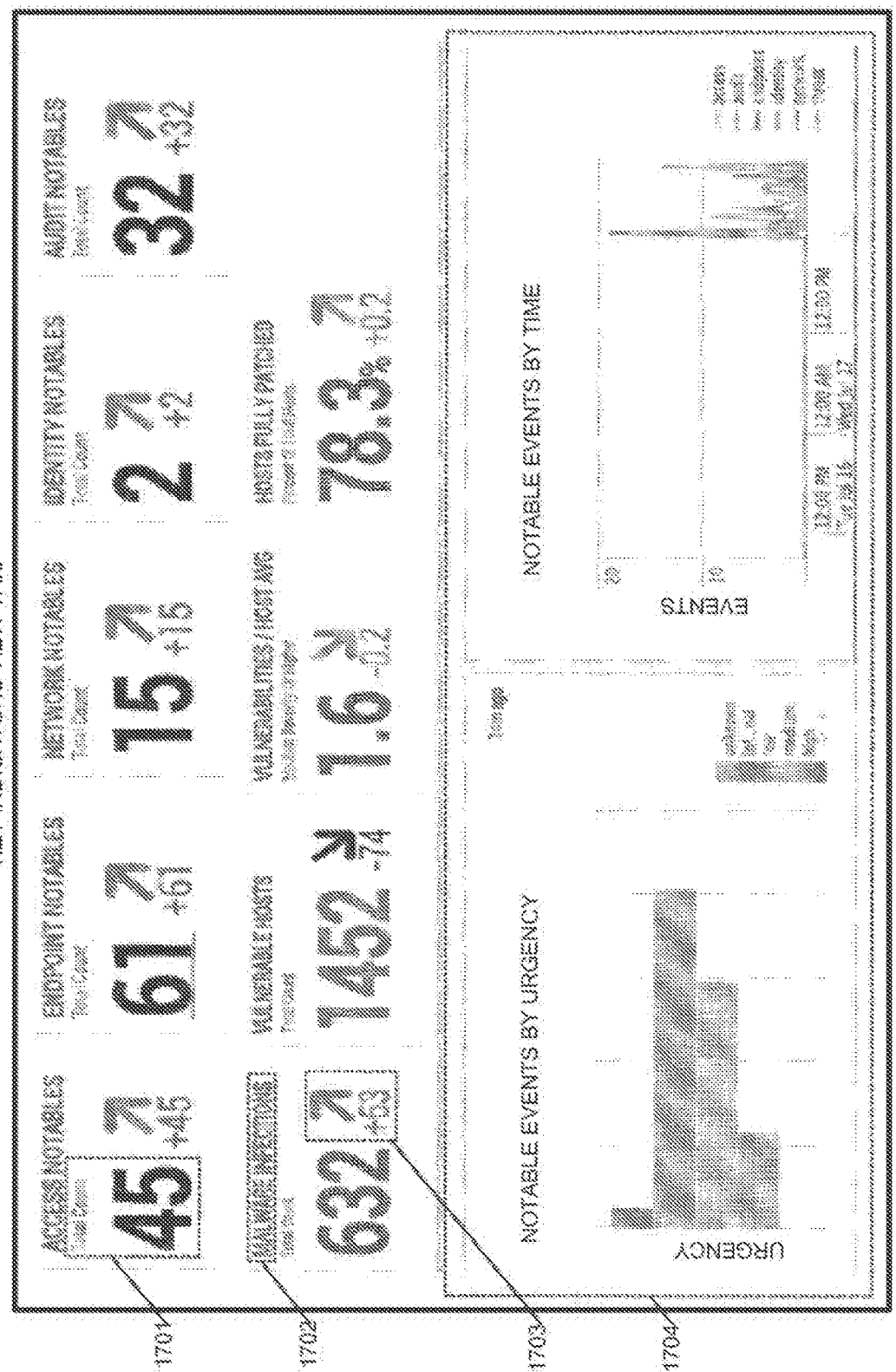
FIG. 11A illustrates an example key indicators view in accordance with the disclosed embodiments.

The SPUNK® APP FOR ENTERPRISE SECURITY provides various visualizations to aid in discovering security threats, such as a "key indicators view" that enables a user to view security metrics of interest, such as counts of different types of notable events. For example, FIG. 11A illustrates an exemplary key indicators view 1700 that comprises a dashboard, which can display a value 1701, for various security-related metrics, such as malware infections 1702. It can also display a change in a metric value 1703, which indicates that the number of malware infections increased by 63 during the preceding interval. Key indicators view 1700 additionally displays a histogram panel 1704 that displays a histogram of notable events organized by urgency values, and a histogram of notable events organized by time intervals. This key indicators view is described in further detail in pending U.S. patent application Ser. No. 13/956,338 filed Jul. 31, 2013, which is hereby incorporated by reference.

Figure 11B:
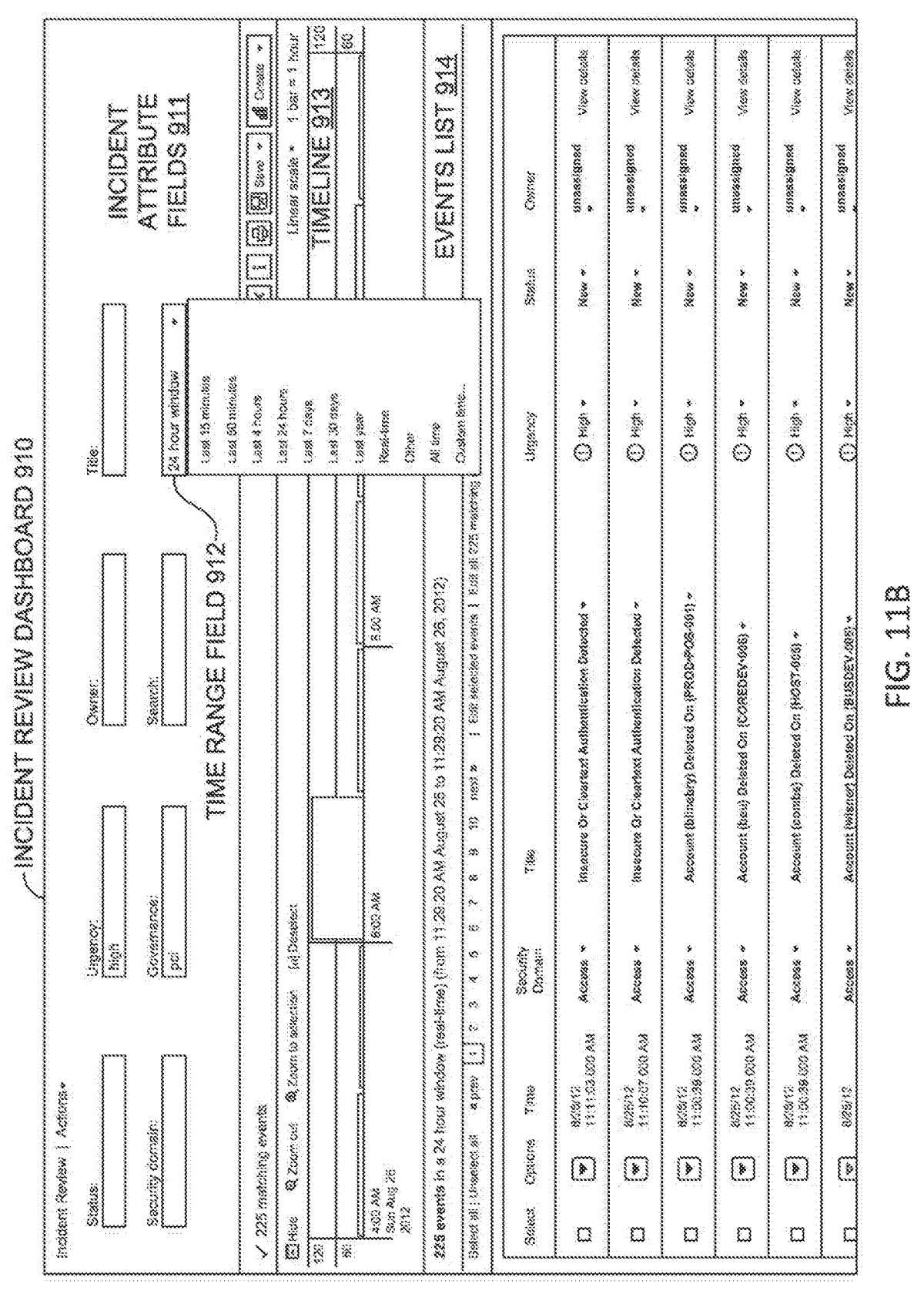

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 11B illustrates an exemplary incident review dashboard 1710 that includes a set of incident attribute fields 1711 that, for example, enables a user to specify a time range field 1712 for the displayed events. It also includes a timeline 1713 that graphically illustrates the number of incidents that occurred in one-hour time intervals over the selected time range. It additionally displays an events list 1714 that enables a user to view a list of all of the notable events that match the criteria in the incident attributes fields 1711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/User/IncidentReviewdashboard."

1.9 Data Center Monitoring

As mentioned above, the SPLUNKO ENTERPRISE platform provides various features that make it easy for developers to create various applications. One such application is the SKUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example, by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR. VMWARE® stores large volumes of minimally processed performance information and log data at ingestion time for later retrieval and analysis at search time when a live performance issue is being investigated.

The SPUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent Ser. No. 14/167,316 filed Jan. 29, 2014, which is hereby incorporated herein by reference. Also, see "vSphere Monitoring and Performance," Update 1, vSphere 5.5, EN-001357-00, http://pubs.vmware.com/vsphere-55/topic/com.vmwareiCbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 11C:
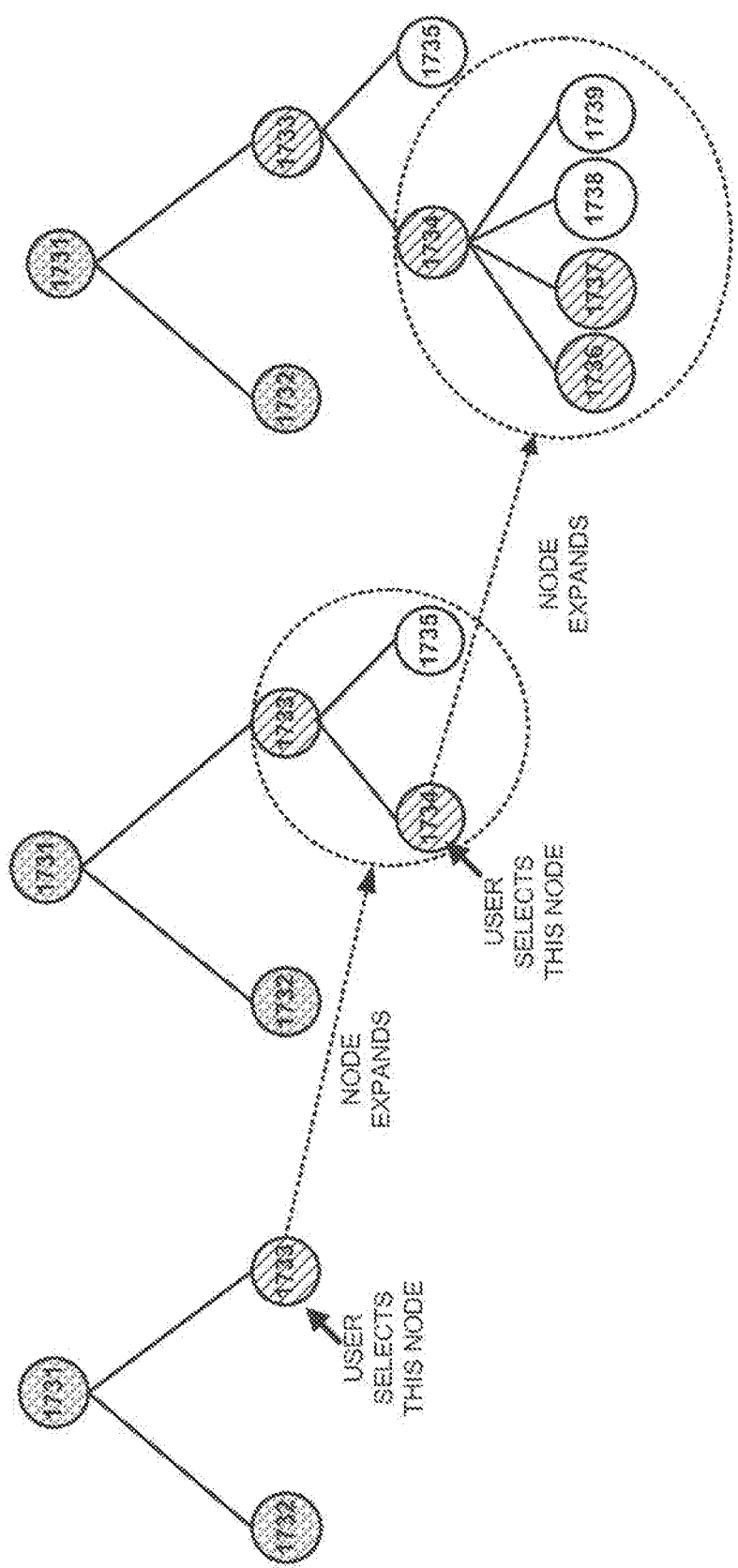
FIG. 11C illustrates an example proactive monitoring tree in accordance with the disclosed embodiments.
Figure 11D:
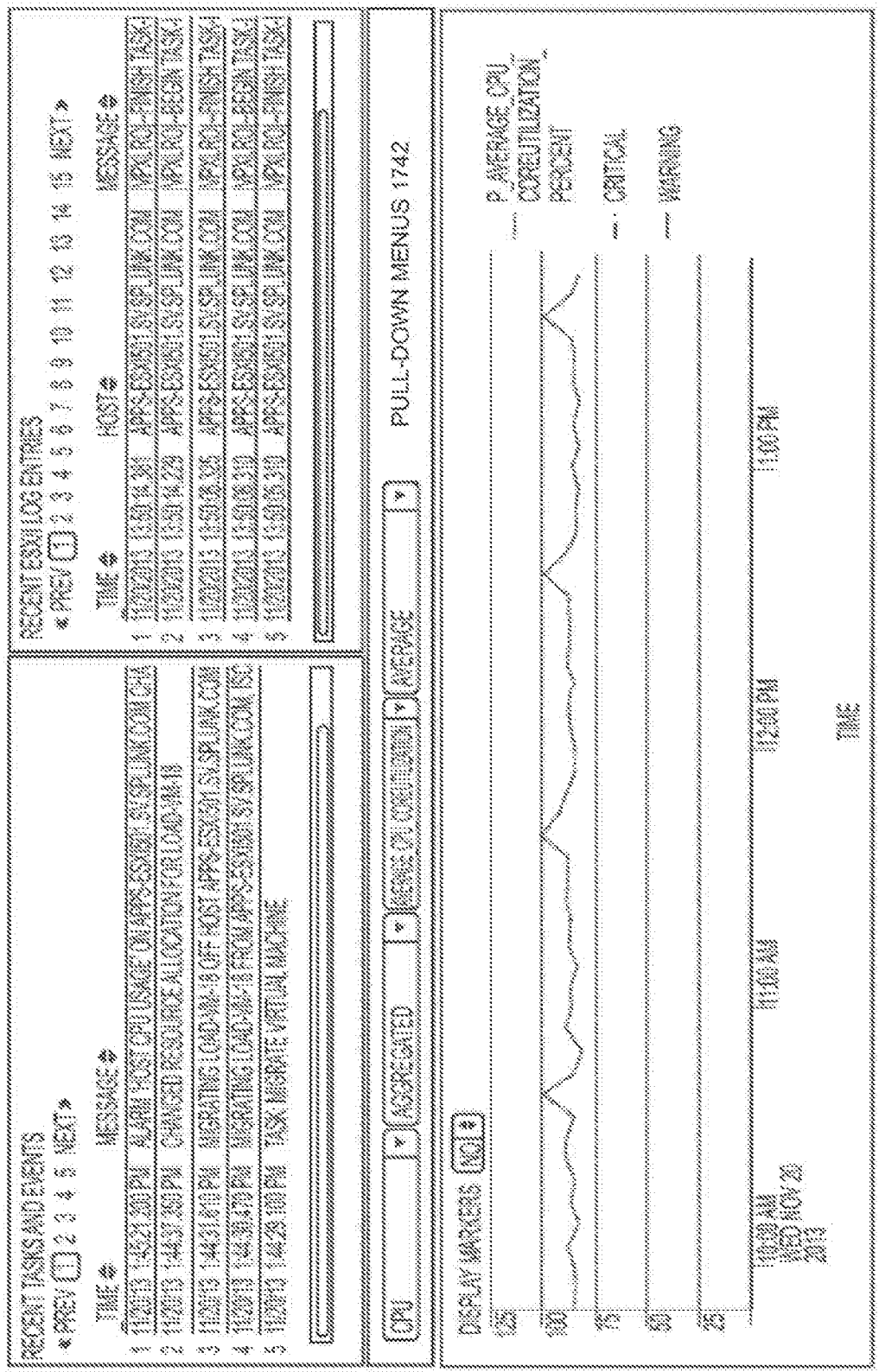
FIG. 11D illustrates an example screen displaying both log data and performance data in accordance with the disclosed embodiments

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 11C, wherein nodes 1733 and 1734 are selectively expanded. Note that nodes 1731-1739 can be displayed using different patterns or colors to represent different performance states, such as a critical state, a warning state, a normal state, or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on Apr. 15, 2014, which is hereby incorporated by reference.

The SPLUNK® APP FOR VMWARE® also provides a user interface that enables a user to select a specific time range and then view heterogeneous data, comprising events, log data and associated performance metrics, for the selected time range. For example, the screen illustrated in FIG. 11D displays a listing of recent "tasks and events" and a listing of recent "log entries" for a selected time range above a performance-metric graph for "average CPU core utilization" for the selected time range. Note that a user is able to operate pull-down menus 1742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on Jan. 29, 2014, which is hereby incorporated by reference.

Further modifications and embodiments of various aspects of the disclosure will be apparent to those skilled in the art in view of this description. Accordingly, this description is to be construed as illustrative only and is for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

It will be appreciated that the methods described are example embodiments of methods that may be employed in accordance with the techniques described herein. The methods may be modified to facilitate variations of their implementation and use. The order of the methods and the operations provided therein may be changed, and various elements may be added, reordered, combined, omitted, modified, etc. Portions of the methods may be implemented in software, hardware, or a combination thereof. Some or all of the portions of the methods may be implemented by one or more of the processors/modules/applications described herein.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the phrase "based on" does not limit the associated operation to being solely based on a particular item. Thus, for example, processing "based on" data A may include processing based at least in part on data A and based at least in part on data B unless the content clearly indicates otherwise. Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

Having thus described the invention, what is claimed is:

1. A method comprising:
    identifying, during a current utilization of an application in which the application accesses data, a set of un-deployed features of the application based on a current configuration of the application, each un-deployed feature of the set of un-deployed features being un-deployed in the current utilization of the application, wherein the current configuration of the application comprises a current software and/or hardware configuration of a system on which the application is being executed, and wherein identifying the set of un-deployed features comprises:
        determining that a first feature of a set of available features is enabled to utilize input data from a data source,
        determining, during the current utilization of the application, that at least one of the application or the first feature is not receiving the input data from the data source, and
        including the first feature in the set of un-deployed features; and
    causing display of a graphical user interface (GUI) that comprises an indication of at least a portion of the un-deployed features including the first feature.

2. The method of claim 1, wherein the at least one of the application or the first feature is not receiving the input data from the data source based on the application or the first feature being improperly configured to receive the input data from the data source.

3. The method of claim 1, wherein the at least one of the application or the first feature is not receiving the input data based on the data source not providing the input data to the at least one of the application or the first feature.

4. The method of claim 1, wherein identifying the set of un-deployed features comprises:
    determining, based on the current configuration of the application and during the current utilization of the application, that the application is properly configured to receive the input data from the data source.

5. The method of claim 1, wherein the at least one of the application or the first feature is not receiving the input data based on the application not including a component to receive the input data from the data source.

6. The method of claim 1, wherein the application is enabled to receive machine-generated data from a hardware device of the system that the application is deployed within and the method further comprises at least one of:
    determining that the system does not currently include the hardware device;
    determining that the system is not currently configured to provide the machine-generated data to the application; or
    determining that the hardware device is not currently configured to provide the machine-generated data to the application.

7. The method of claim 1, the method further comprises:
    identifying, during the current utilization of the application, a set of deployed features based on the configuration of the application; and
    causing display of the GUI, wherein the GUI further comprises an indication of at least a portion of the set of deployed features.

8. The method of claim 1, further comprising:
    determining a currently unsatisfied condition associated with the first feature of the set of un-deployed features, wherein an occurrence of an event that satisfies the currently unsatisfied condition causes a triggering of a deployment of the first feature within the application; and
    causing display of the GUI, which further comprises an indication of the currently unsatisfied condition.

9. The method of claim 1, further comprising:
    determining a currently unsatisfied condition associated with the first feature of the set of un-deployed features, wherein an occurrence of an event that satisfies the currently unsatisfied condition causes a triggering of a deployment of the first feature within the application;
    causing display of the GUI, which further comprises an interactive link that indicates at least one of the currently unsatisfied condition or the first feature;
    in response to receiving a selection of the interactive link, causing the occurrence of the event that satisfies the currently unsatisfied condition; and
    in response to satisfying the currently unsatisfied condition, causing the triggering of the deployment of the first feature within the application and transitioning the first feature from the set of un-deployed features to a first deployed feature of a set of deployed features.

10. The method of claim 1, further comprising:
    determining a currently unsatisfied condition associated with the first feature of the set of un-deployed features, wherein the currently unsatisfied condition includes a linking to the data source; and
    causing display of the GUI, which further comprises an interactive link that includes at least one of the linking to the data source of a navigation to a location for configuring the linking to the data source.

11. The method of claim 1, further comprising:
    determining a currently unsatisfied condition associated with the first feature of the set of un-deployed features, wherein the currently unsatisfied condition includes an installing of a second application; and
    causing display of the GUI, which further comprises an interactive link that includes at least one of the installing of the second application or a navigation to a location for the installing of the second application.

12. The method of claim 1, further comprising:
determining a currently unsatisfied condition associated with the first feature of the set of un-deployed features, wherein satisfying the currently unsatisfied condition causes a deployment of the first feature within the application; and
causing display of the GUI, which further comprises an interactive link that is selectable to navigate to instructions for satisfying the currently unsatisfied condition.

13. The method of claim 1, further comprising:
determining a currently unsatisfied condition associated with the first feature of the set of un-deployed features, wherein a transaction that includes purchasing an item satisfies the currently unsatisfied condition; and
causing display of the GUI, which further comprises an interactive link that, when selected, causes a navigation to a network site that enables an initiation of the transaction that includes purchasing the item.

14. The method of claim 1, further comprising:
determining a currently unsatisfied condition associated with the first feature of the set of un-deployed features, wherein a transaction that includes obtaining an item from a third party satisfies the currently unsatisfied condition; and
causing display of the GUI, which further comprises an interactive link that, when selected, causes a navigation to a network site that enables an initiation of the transaction that includes obtaining the item from the third party.

15. The method of claim 1, further comprising:
identifying, during the current utilization of the application, a set of deployed features, wherein each deployed feature of the identified set of deployed features is configured to utilize the input data from the data source, and the current configuration of the application indicates that the application is currently configured to provide the input data for utilization by the deployed feature; and
causing display of the GUI, wherein the GUI further comprises an indication of at least a portion of the deployed features.

16. The method of claim 1, further comprising:
identifying a set of un-deployed data models, wherein each un-deployed data model of the set of un-deployed data models includes a data model that is mapped to at least one un-deployed feature of the set of the un-deployed features; and
causing display of the GUI, wherein the GUI further comprises an indication of a cardinality of the set of un-deployed data models.

17. The method of claim 1, wherein the application is configured to employ searches of machine-generated input data using a late-binding schema.

18. A system comprising:
one or more processors; and
one or more memories comprising program instructions stored thereon that are executable by the one or more processors to cause a performance of a method comprising:
identifying, during a current utilization of an application in which the application accesses data, a set of un-deployed features of the application based on a current configuration of the application, each un-deployed feature of the set of un-deployed features being un-deployed in the current utilization of the application, wherein the current configuration of the application comprises a current software and/or hardware configuration of a first system on which the application is being executed, and wherein identifying the set of un-deployed features comprises:
determining that a first feature of a set of available features is enabled to utilize input data from a data source,
determining, during the current utilization of the application, that at least one of the application or the first feature is not receiving the input data from the data source, and
including the first feature in the set of un-deployed features; and
causing display of a graphical user interface (GUI) that comprises an indication of at least a portion of the un-deployed features including the first feature.

19. A non-transitory computer-readable medium comprising program instructions stored thereon that are executable by one or more processors to perform a method comprising:
identifying, during a current utilization of an application in which the application accesses data, a set of un-deployed features of the application based on a current configuration of the application, each un-deployed feature of the set of un-deployed features being un-deployed in the current utilization of the application, wherein the current configuration of the application comprises a current software and/or hardware configuration of a system on which the application is being executed, and wherein identifying the set of un-deployed features comprises:
determining that a first feature of a set of available features is enabled to utilize input data from a data source,
determining, during the current utilization of the application, that at least one of the application or the first feature is not receiving the input data from the data source, and
including the first feature in the set of un-deployed features; and
causing display of a graphical user interface (GUI) that comprises an indication of at least a portion of the un-deployed features.

\* \* \* \* \*